US010761621B2

(12) United States Patent
Oyama et al.

(10) Patent No.: US 10,761,621 B2
(45) Date of Patent: Sep. 1, 2020

(54) METHOD EXECUTED BY PEN OR PEN DETECTION APPARATUS THAT DETECTS THE PEN

(71) Applicant: Wacom Co., Ltd., Saitama (JP)

(72) Inventors: Takaya Oyama, Saitama (JP); Ken Suzuki, Tokyo (JP); Yoshihisa Sugiyama, Saitama (JP); Takashi Suzuki, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/249,767

(22) Filed: Jan. 16, 2019

(65) Prior Publication Data

US 2019/0235649 A1  Aug. 1, 2019

(30) Foreign Application Priority Data

Jan. 29, 2018  (JP) ................................ 2018-012466

(51) Int. Cl.
*G06F 3/0354* (2013.01)
*G06F 3/041* (2006.01)

(52) U.S. Cl.
CPC ........ *G06F 3/03545* (2013.01); *G06F 3/0414* (2013.01)

(58) Field of Classification Search
CPC .. G06F 3/03545; G06F 3/0414; G06F 3/0442; G06F 1/1698; G06F 3/0416; G06F 3/041; G06F 3/044; G01L 1/18
See application file for complete search history.

(56) References Cited

U.S. PATENT DOCUMENTS

| 2014/0184551 | A1* | 7/2014 | Igarashi | G06F 3/041 345/173 |
| 2015/0185923 | A1* | 7/2015 | Yoon | G06F 3/0416 345/174 |
| 2016/0085356 | A1* | 3/2016 | Stern | G01L 1/18 345/179 |
| 2016/0299628 | A1* | 10/2016 | Ribeiro | G06F 3/0414 |
| 2017/0123568 | A1* | 5/2017 | Takeda | G06F 3/0416 |
| 2017/0131817 | A1* | 5/2017 | Wong | G06F 3/044 |
| 2017/0351350 | A1* | 12/2017 | Aloui | G06F 3/03545 |
| 2019/0212837 | A1* | 7/2019 | Wong | G06F 1/1698 |

\* cited by examiner

*Primary Examiner* — Richard J Hong
(74) *Attorney, Agent, or Firm* — Seed IP Law Group LLP

(57) ABSTRACT

A method performed by a pen or a pen detection apparatus that detects the pen, the method includes: acquiring a pen pressure level according to a force applied to a pen nib of the pen; generating a pen-down event or a pen-up event based on a result of comparing the pen pressure level and a pen pressure determination threshold; acquiring a proximity value indicating a positional relationship between the pen and the pen detection apparatus from a proximity detector provided on one of the pen and the pen detection apparatus; and updating the pen pressure determination threshold based on the pen pressure level when the proximity value indicates that the positional relationship between the pen and the pen detection apparatus satisfies a predetermined relationship.

18 Claims, 13 Drawing Sheets

METHOD EXECUTED BY PEN OR PEN DETECTION APPARATUS THAT DETECTS THE PEN

BACKGROUND

Technical Field

The present disclosure relates to a method performed by a pen or a pen detection apparatus that detects the pen.

Background Art

There is a known electronic device that detects a position of a pen on a panel surface to enable pen input. This type of electronic device detects the pen based on a pen pressure level indicating a level of pen pressure detected by a pen pressure detection sensor embedded in the pen. More specifically, the pen transmits a burst signal for position detection and a data signal including a detection result of the pen pressure detection sensor to a pen detection apparatus in the electronic device. The pen detection apparatus detects the position of the pen on the panel surface based on the burst signal and acquires the pen pressure level from the received detection result of the pen pressure detection sensor to perform threshold determination. When the pen pressure level exceeds a predetermined threshold (hereinafter, referred to as "pen pressure determination threshold"), the pen detection apparatus detects contact with the panel surface by the pen and generates a pen-down event. When the pen pressure level falls below the pen pressure determination threshold, the pen detection apparatus detects separation of the pen from the panel surface and generates a pen-up event. Each time, the pen detection apparatus outputs the detected position of the pen, various data (including the pen pressure level) received from the data signal, and data indicating the generation of various events to a host processor in the electronic device.

The host processor can execute a drawing application. The drawing application performs a process of drawing the series of positions (trajectory of the pen) detected between the generation of the pen-down event and the generation of the pen-up event, with a thickness according to the pen pressure level corresponding to each position. Therefore, a drawing process different from the contact state is performed if the pen pressure determination threshold is not an appropriate value so that the pen-down event is not generated unless force is further applied even when the pen is already in contact with the panel surface, or conversely, if the pen-up event is not generated even when the pen is already separated from the panel surface. This adversely affects the usability of the user.

An invention for calibrating the pen pressure determination threshold is disclosed in U.S. Patent Application Publication No. 2017-0131817. In the invention, the pen pressure level that is smaller than the current pen pressure determination threshold and that is transitioning within a predetermined deviation is statistically processed to derive a reference level Vzero of the pen pressure level. A predetermined offset Voffset is added to the reference level Vzero, and the value Vzero+Voffset is used as a new pen pressure determination threshold. This can reduce variations in the generation timing of the pen-down event caused by variations between pens or by temporal variations regarding the output level of the pen pressure detection sensor.

However, there are some problems regarding the pen pressure determination threshold that are not solved by the technique of U.S. Patent Application Publication No. 2017-0131817. The problems will now be described in detail.

A first problem is generation of an ink leakage phenomenon. There is hysteresis in the pen pressure detection sensor (structural hysteresis caused by generation of a friction force that varies between during loading and during unloading such as when the core body pushed into the housing during loading is stuck to the housing during unloading, or physical hysteresis of a member used in the pen pressure detection sensor (such as an elastic body used in a variable capacitor or the like), hereinafter, the hysteresis will be simply referred to as "hysteresis"). Therefore, even when the force applied to the pen nib for a while is not there anymore, the output level does not immediately return to the original level, and the output level slowly returns to the original level over some time period. Due to the nature of the pen pressure detection sensor, the pen pressure level may continue to exceed the pressure determination threshold even after the pen-up, and the drawing by the drawing application may continue for a while. In such a case, the user may feel as if the ink is leaking. This phenomenon will be referred to as an "ink leakage phenomenon."

A second problem is that the calibration of the pen pressure determination threshold based on the method described in U.S. Patent Application Publication No. 2017-0131817 may not be completed before the next pen-down after the pen-up. In order to calibrate the pen pressure determination threshold based on the method described in U.S. Patent Application Publication No. 2017-0131817, samples of the pen pressure level need to be acquired in the pen-up state throughout a predetermined time period. However, a sufficient number of samples may not be obtained before the next pen-down after the pen-up when, for example, the user quickly operates the pen. In addition, the pen pressure level in the pen-up state may fluctuate beyond the predetermined deviation when the pen nib is stuck to the housing of the pen, and the samples of the pen pressure level necessary for the calibration may not be obtained in such a case. As a result, the calibration is not completed before the next pen-down after the pen-up.

A third problem is that the pen pressure determination threshold is not calibrated at the right time. Usually, it is sufficient to perform the calibration once for each pen-down. However, in the technique of U.S. Patent Application Publication No. 2017-0131817, the calibration may be repeatedly performed inside the pen in the pen-up state. The repeated process may reduce the battery life of the pen.

BRIEF SUMMARY

Therefore, an object of the present disclosure is to provide a method performed by a pen or a pen detection apparatus that detects the pen capable of solving the problems.

A first aspect of the present disclosure provides a method performed by a pen or a pen detection apparatus that detects the pen, the method including: acquiring a pen pressure level according to a force applied to a pen nib of the pen; generating a pen-down event or a pen-up event based on a result of comparing the pen pressure level and a pen pressure determination threshold; acquiring a proximity value indicating a positional relationship between the pen and the pen detection apparatus from a proximity detector provided on one of the pen and the pen detection apparatus; and updating the pen pressure determination threshold based on the pen pressure level when the proximity value indicates that the positional relationship between the pen and the pen detection apparatus satisfies a predetermined relationship.

A second aspect of the present disclosure provides a method performed by a pen or a pen detection apparatus that detects the pen, the method including: acquiring, from a pen pressure detection sensor provided on the pen, a pen pressure level according to a force applied to a pen nib of the pen; generating a pen-down event based on a result of comparing the pen pressure level and a first threshold; and generating a pen-up event based on a result of comparing the pen pressure level and a second threshold different from the first threshold.

A third aspect of the present disclosure provides a method performed by a pen or a pen detection apparatus that detects the pen, the method including: acquiring a pen pressure level according to a force applied to a pen nib of the pen; generating a pen-down event based on a result of comparing the pen pressure level and a pen pressure determination threshold; and updating the pen pressure determination threshold, triggered by the generating of the pen-down event, in which in the generating the pen-down event, a (k+1)th pen-down event is generated based on a result of comparing the pen pressure level and the pen pressure determination threshold after the updating in a first update triggered by generating a kth pen-down event.

According to the first aspect of the present disclosure, the pen pressure determination threshold can be updated based on one pen pressure level (without using statistics) acquired at an appropriate time, and this can reduce the possibility of incompletion of the calibration before the next pen-down after the pen-up. In addition, the pen pressure determination threshold can be immediately updated when the proximity value acquired from the proximity detector indicates that the positional relationship between the pen and the pen detection apparatus satisfies a predetermined threshold, and this can reduce the ink leakage phenomenon.

According to the second aspect of the present disclosure, the pen-down event and the pen-up event can be appropriately generated without using the hysteresis of the pen pressure detection sensor, and this can eliminate the ink leakage phenomenon early.

According to the third aspect of the present disclosure, the pen pressure determination threshold can be updated once for each pen-down. Therefore, the pen pressure determination threshold can be calibrated at the right time. In addition, the pen pressure determination threshold can be updated even when the calibration that takes a long time as in the calibration described in U.S. Patent Application Publication No. 2017-0131817 cannot be performed, such as when the user quickly operates the pen.

DETAILED DESCRIPTION OF THE PREFERRED EMBODIMENTS

Embodiments of the present disclosure will now be described in detail with reference to the attached drawings.

Figure 1:
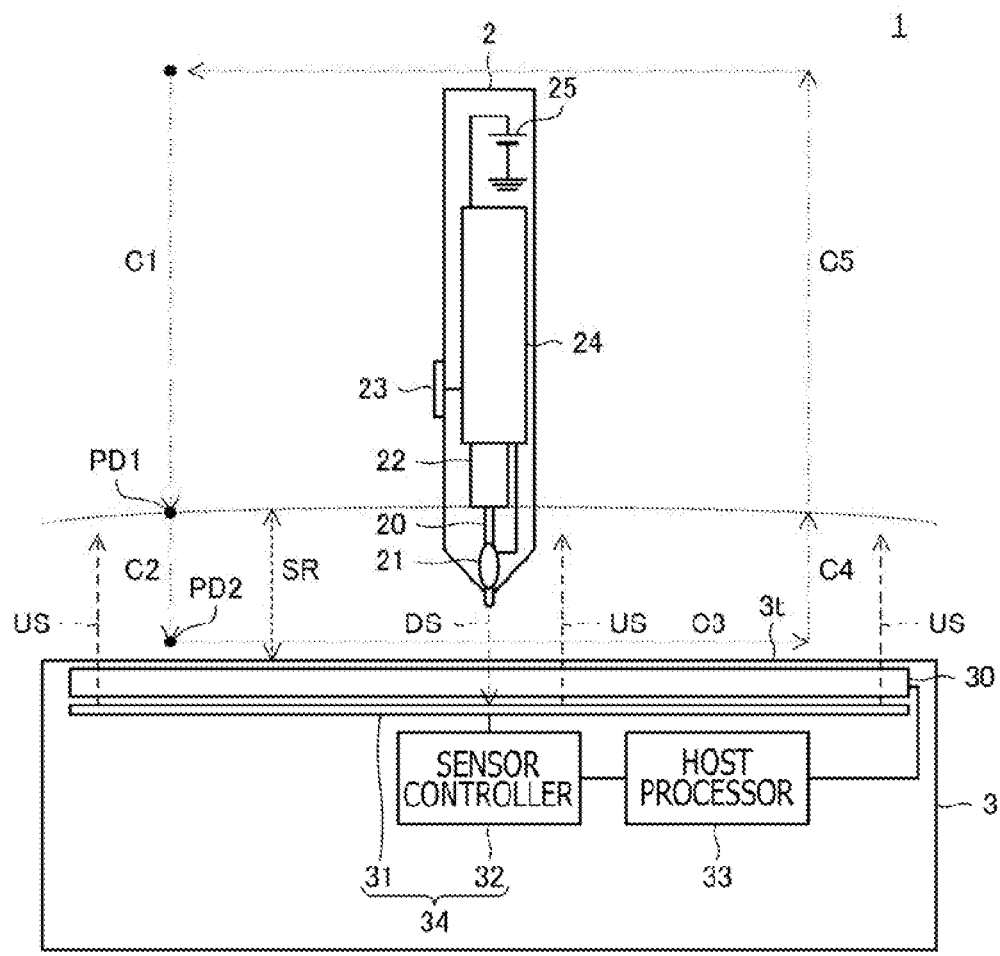
FIG. 1 depicts a configuration of a position detection system according to a first embodiment of the present disclosure.

FIG. 1 depicts a configuration of a position detection system 1 according to a first embodiment of the present disclosure. As illustrated in FIG. 1, the position detection system 1 includes a pen 2 and an electronic device 3. Of these, the electronic device 3 is, for example, a tablet computer, and the electronic device 3 includes, for example: a display apparatus 30, such as a liquid crystal display and an organic EL display; a sensor 31 provided on the back surface (or front surface) of the display apparatus 30; a sensor controller 32 connected to the sensor 31; and a host processor 33 that controls each component of the electronic device 3 including these components. The sensor 31 and the sensor controller 32 among the components configure a pen detection apparatus 34 that detects the pen 2. The display surface of the display apparatus 30 is a flat glass surface providing a panel surface 3t for a user to slide the pen 2 on the surface.

The sensor controller 32 and the pen 2 can mutually transmit and receive signals through the sensor 31. A signal transmitted by the pen 2 toward the sensor controller 32 will be referred to as a downlink signal DS, and a signal transmitted by the sensor controller 32 toward the pen 2 will be referred to as an uplink signal US. The downlink signal DS includes: a burst signal for the sensor controller 32 to detect the position of the pen 2; and a data signal including various modulated data of a pen identification (ID) provided to the pen 2, a pen pressure level detected by a pen pressure detection circuit 22 described later, and data indicating an on/off state of a switch 23 described later. On the other hand, the uplink signal US includes a command signal indicating an instruction from the sensor controller 32 to the pen 2.

The user moves the pen 2 while the pen nib is in contact with the panel surface 3t to thereby perform a pen input for the electronic device 3. Dashed arrows C1 to C5 in FIG. 1 indicate a typical cycle of the operation of the pen 2 by the user. A sensing range SR illustrated in FIG. 1 indicates a range in which one of the pen 2 and the sensor controller 32 can detect the other through an operation by the pen 2 receiving the uplink signal US transmitted by the sensor controller 32 or through an operation by the sensor controller 32 receiving the downlink signal DS transmitted by the pen 2.

When the user uses the pen 2 to draw a line on the panel surface 3t, the user repeats a series of cycles of moving the pen 2 from the outside of the sensing range SR to the inside of the sensing range SR (pen-down operation, C1 and C2 in FIG. 1), moving the pen 2 while the pen nib is in contact with the panel surface 3t (pen move operation, C3 in FIG. 1), and moving the pen 2 from the inside of the sensing range SR to the outside of the sensing range SR (pen-up operation, C4 and C5 in FIG. 1). The sensor controller 32 receives the downlink signal DS through the sensor 31 while the pen 2 is in the sensing range SR to thereby detect the position of the pen 2 on the panel surface 3t and receive various data transmitted by the pen 2. The sensor controller 32 appropriately generates a pen-down event and a pen-up event based on the pen pressure level included in the received data. Each time, the sensor controller 32 outputs the detected position, the received various data, and the received data indicating the generation of the event to the host processor 33. The host processor 33 renders a line drawing based on the series of positions supplied between the pen-down event and the pen-up event. This allows the user to input a desirable figure to the electronic device 3.

As illustrated in FIG. 1, the pen 2 includes a core body 20, an electrode 21, the pen pressure detection circuit 22, the switch 23, a signal processing circuit 24, and a power source 25.

The core body 20 is a rod-like member arranged such that a longitudinal direction of the core body 20 coincides with a penholder direction of the pen 2, and the core body 20 configures the pen nib of the pen 2. A conductive material is applied to the surface of the front end of the core body 20 to configure the electrode 21. The back end of the core body 20 is in contact with the pen pressure detection circuit 22. The pen pressure detection circuit 22 is a sensor (pen pressure detection sensor) that detects the pen pressure level according to the pressure applied to the tip of the core body 20 (pen pressure applied to the core body 20) when the pen nib of the pen 2 is pressed against the panel surface 3t or the like of the sensor controller 32, and the pen pressure detection circuit 22 includes, for example, a variable module in which the capacitance changes according to the pen pressure.

The electrode 21 is a conductor provided near the core body 20 and is electrically connected to the signal processing circuit 24 through a wire. When the pen 2 transmits the downlink signal DS toward the sensor controller 32, the signal processing circuit 24 supplies the downlink signal DS to the electrode 21, and in response, charge according to the content of the downlink signal DS is induced in the electrode 21. As a result, the capacitance is changed in the sensor 31, and the sensor controller 32 detects the change to thereby receive the downlink signal DS. When the uplink signal US transmitted by the sensor controller 32 reaches the electrode 21, charge according to the arrived uplink signal US is induced in the electrode 21. The signal processing circuit 24 detects the charge induced in the electrode 21 in this way to thereby receive the uplink signal US.

The switch 23 is, for example, a side switch provided on the side surface of a housing of the pen 2, and the switch 23 functions as an input circuit that can receive an operation by the user. Specifically, the switch 23 is configured to output, to the signal processing circuit 24, switch information indicating the pressed state of the switch 23 according to the state of the operation by the user (pressed state). The switch information is, for example, information indicating one of an ON state and an OFF state.

The signal processing circuit 24 has: a function of receiving the uplink signal US transmitted by the sensor controller 32 through the electrode 21 and decoding the uplink signal US; and a function of generating the downlink signal DS according to the command signal included in the uplink signal US and transmitting the downlink signal DS toward the sensor controller 32 through the electrode 21. Note that the pen ID is written to an internal memory (not illustrated) of the signal processing circuit 24 in a manufacturing stage.

The signal processing circuit 24 can further include: a function of generating a pen-down event indicating contact with the panel surface 3t by the pen 2 and a pen-up event indicating separation of the pen 2 from the panel surface 3t based on the pen pressure level detected by the pen pressure detection circuit 22 and transmitting the data indicating each event by including the data in the downlink signal DS each time the event is generated; a function of detecting the reception strength of the uplink signal US and acquiring the proximity indicating the positional relationship between the pen 2 and the sensor controller 32 based on the result of the detection; and a function of holding a threshold of pen pressure level (pen pressure determination threshold) used for detecting the generation of the pen-down event and the generation of the pen-up event and updating the threshold as necessary. The details of the functions will be described later in a third embodiment.

The power source 25 is configured to supply operating power (direct current voltage) to the signal processing circuit 24 and includes, for example, a cylindrical AAAA battery.

The sensor 31 includes a plurality of sensor electrodes (not illustrated). The sensor controller 32 receives the downlink signal DS through the sensor 31 and detects the position of the pen 2 on the panel surface 3t based on the reception strength of the downlink signal DS at each sensor electrode. The sensor 31 also demodulates the downlink signal DS to acquire various data included in the data signal and generates the pen-down event indicating the contact with the panel surface 3t by the pen 2 and the pen-up event indicating the separation of the pen 2 from the panel surface 3t based on the pen pressure level in the data. The sensor controller 32 successively supplies the detected position, the acquired various data, and the data indicating the generation of the event to the host processor 33.

The host processor 33 is a central processing unit of the electronic device 3 and is capable of executing various applications including a drawing application. In the operation of the drawing application, the host processor 33 interpolates discrete positions successively supplied from the sensor controller 32 to render a line drawing and outputs the rendering result to the display apparatus 30. As a result, the figure input by the user using the pen 2 is displayed on the panel surface 3t.

Figure 2:
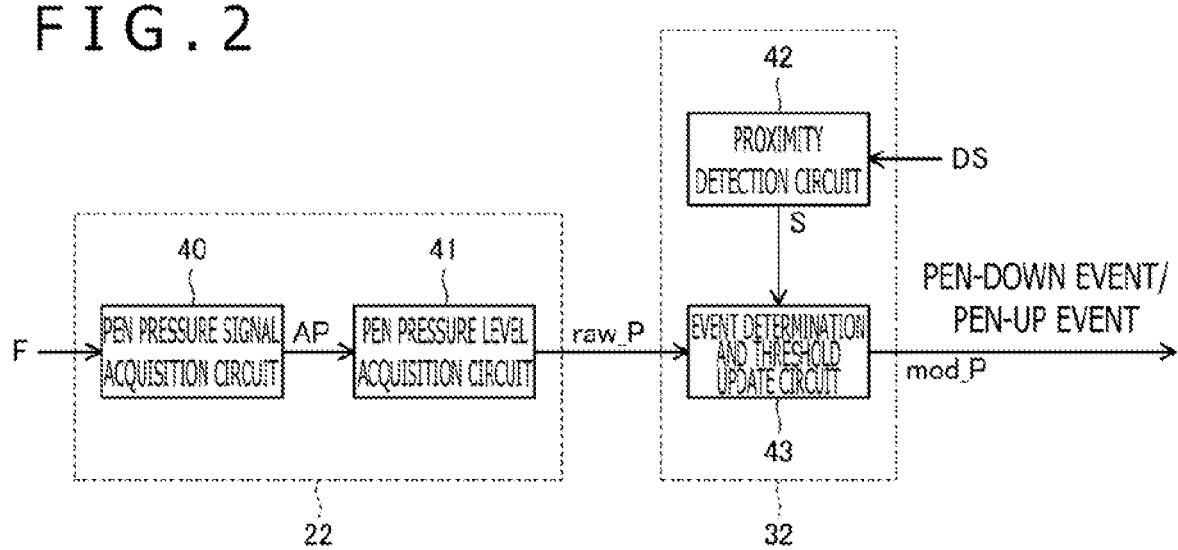
FIG. 2 is a schematic block diagram illustrating functional blocks of a pen pressure detection circuit and a signal processing circuit illustrated in FIG. 1.

FIG. 2 is a schematic block diagram illustrating functional circuits of the pen pressure detection circuit 22 and the sensor controller 32. As illustrated in FIG. 2, the pen pressure detection circuit 22 functionally includes a pen pressure signal acquisition circuit 40 and a pen pressure level acquisition circuit 41, and the sensor controller 32 functionally includes a proximity detection circuit 42 (proximity detector) and an event determination and threshold update circuit 43.

The pen pressure signal acquisition circuit 40 performs a process of converting pressure F applied to the tip of the core body 20 into an analog pen pressure signal AP. The pen pressure level acquisition circuit 41 generates a pen pressure level raw_P that is a digital value based on the analog pen pressure signal AP. Specifically, for example, the pen pressure signal acquisition circuit 40 is a time constant circuit, and the pen pressure level acquisition circuit 41 is a clock counting circuit. In this case, the analog pen pressure signal AP is a signal indicating a time period according to a time constant decided by the capacitance that changes according to the pressure F. The pen pressure level acquisition circuit 41 serves as a circuit that counts the clock supplied from an oscillator not illustrated throughout the time period designated by the analog pen pressure signal AP. The pen pressure level raw_P is a signal indicating the result of counting.

The signal processing circuit 24 illustrated in FIG. 1 transmits, as part of the data signal, the pen pressure level raw_P detected by the pen pressure detection circuit 22 to the sensor controller 32. Note that the signal processing circuit 24 may transmit the analog pen pressure signal AP to the sensor controller 32, and the function of the pen pressure level acquisition circuit 41 may be provided in the sensor controller 32.

The proximity detection circuit 42 has a function of detecting a maximum value (maximum reception strength) of the reception strength of the downlink signal DS at each sensor electrode. The detected maximum reception strength is supplied, as a proximity S indicating the positional relationship between the pen 2 and the pen detection apparatus 34, to the event determination and threshold update circuit 43.

The event determination and threshold update circuit 43 has a function of comparing the pen pressure level raw_P received from the pen 2 and the pen pressure determination threshold stored in advance and generating the pen-down event and the pen-up event based on the result of the comparison. The event determination and threshold update circuit 43 is also configured to update the pen pressure determination threshold based on the pen pressure level raw_P when the proximity S supplied from the proximity detection circuit 42 indicates that the positional relationship between the pen 2 and the pen detection apparatus 34 satisfies a predetermined relationship.

Figure 3:
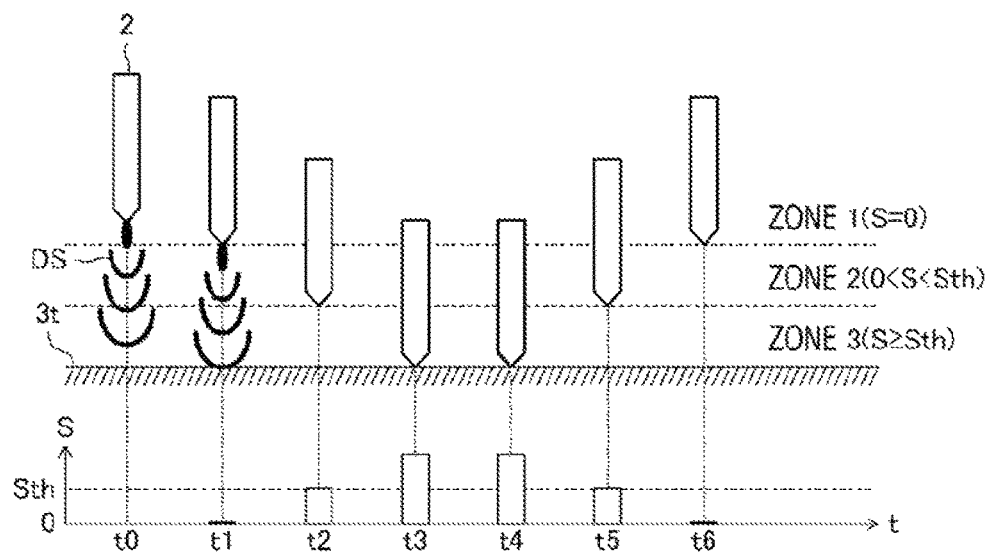
FIG. 3 depicts a relationship between a relative positional relationship between a pen and a pen detection apparatus and a proximity value.

FIG. 3 depicts a relationship between the relative positional relationship between the pen 2 and the pen detection apparatus 34 and the proximity S. In the present embodiment, the relative positional relationship between the pen 2 and the sensor controller 32 is classified into three types according to the value of the proximity S. Specifically, the positional relationship is classified into a zone 1 in which the proximity S is 0 (that is, an area in which the sensor controller 32 cannot receive the downlink signal DS), a zone 2 in which the proximity S is greater than 0 and smaller than a predetermined threshold Sth, and a zone 3 in which the proximity S is equal to or greater than the threshold Sth. The proximity S is the maximum reception strength of the downlink signal DS in the sensor controller 32, and the zones 1 to 3 indicate the distances from the panel surface 3t. Specifically, the zone 3 indicates an area closest to the panel surface 3t, the zone 1 indicates an area farthest from the panel surface 3t, and the zone 2 indicates an area between the zone 1 and the zone 3.

The event determination and threshold update circuit 43 updates the pen pressure determination threshold when the proximity S indicates that the pen 2 is in the zone 2. In this case, the downlink signal DS can be received, and it is guaranteed that the pen nib of the pen 2 is not in contact with the panel surface 3t. Therefore, the event determination and threshold update circuit 43 sets the pen pressure level raw_P in the case where the proximity S indicates that the pen 2 is in the zone 2, as a reference value of the pen pressure level (value indicating the pen pressure level raw_P when pressure is not applied to the pen nib, i.e. system reference value described later). The event determination and threshold update circuit 43 updates the pen pressure determination threshold based on the reference value.

FIG. 2 will be described again. The event determination and threshold update circuit 43 is configured to supply the data indicating the generation of the pen-down event and the pen-up event and the pen pressure level received from the pen 2 to the host processor 33 (see FIG. 1). However, the event determination and threshold update circuit 43 normalizes the pen pressure level raw_P detected by the pen pressure detection circuit 22 and supplies the pen pressure level raw_P to the host processor 33 instead of supplying the pen pressure level raw_P to the host processor 33. Hereinafter, the normalized pen pressure level raw_P will be referred to as a normalized pen pressure level mod_P.

Figure 4:
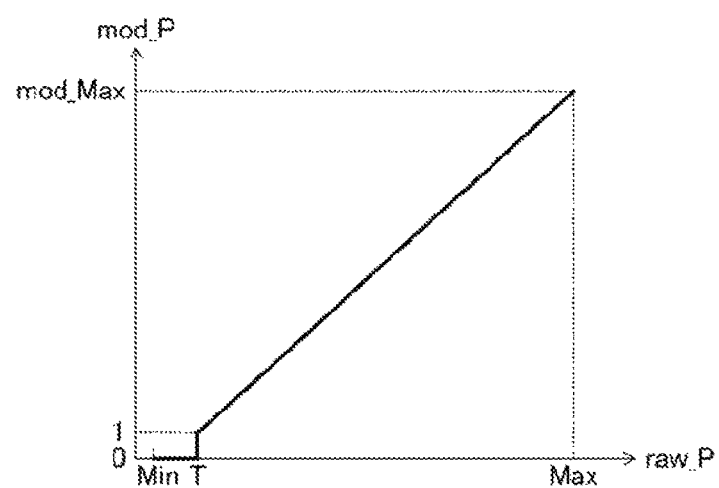
FIG. 4 depicts a relationship between a pen pressure level and a normalized pen pressure level.

FIG. 4 depicts a relationship between the pen pressure level raw_P and the normalized pen pressure level mod_P. As illustrated in FIG. 4, the pen pressure level raw_P is a value equal to or greater than Min and equal to or smaller than Max. The normalized pen pressure level mod_P is a value equal to or greater than 0 and equal to or smaller than mod_Max. The event determination and threshold update circuit 43 fixes the normalized pen pressure level mod_P to 0 when the pen pressure level raw_P is smaller than a pen pressure determination threshold T. On the other hand, the event determination and threshold update circuit 43 uses the following Equation (1) to decide the normalized pen pressure level mod_P when the pen pressure level raw_P is equal to or greater than the pen pressure determination threshold T.

$$\text{mod\_}P = ((\text{mod\_Max} - 1) \times \text{raw\_}P + \text{Max} - \text{mod\_Max} \times T) / (\text{Max} - T) \qquad (1)$$

According to Equation (1), the normalized pen pressure level mod_P is 1 when the pen pressure level raw_P is equal to the pen pressure determination threshold T, and the normalized pen pressure level mod_P is the maximum value mod_Max when the pen pressure level raw_P is the maximum value Max. Although the minimum value Min, the maximum value Max, and the pen pressure determination threshold T of the pen pressure level raw_P vary depending on the type and the individual differences of the pen pressure detection circuit 22, it is not preferable if the output pen pressure level varies depending on the type or the individual differences of the pen pressure detection circuit 22 or depending on the timing of the pen-down operation even when the same predetermined force exceeding the pen pressure determination threshold T is applied. Using the normalized pen pressure level mod_P instead of the pen pressure level raw_P can reduce the effect of the type and the individual differences of the pen pressure detection circuit 22 on the rendering result of the host processor 33.

Figure 5:
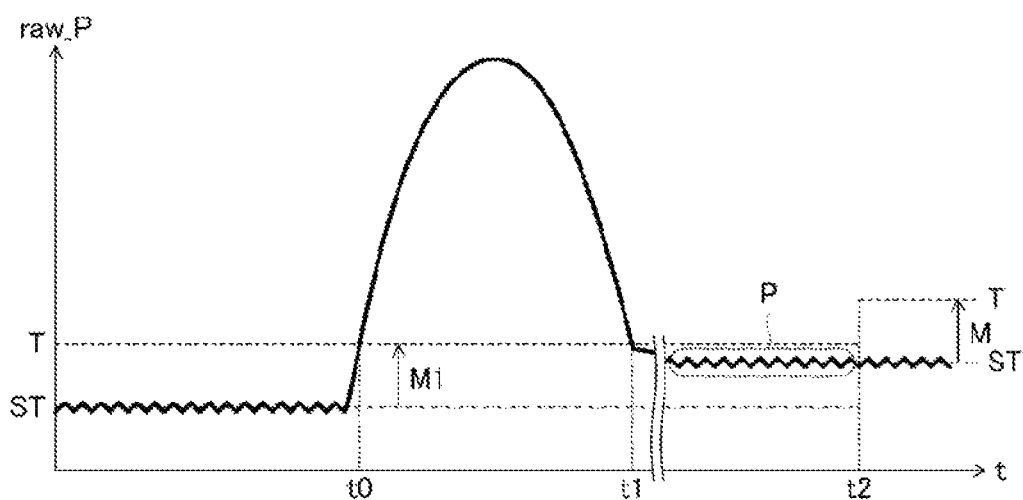
FIG. 5 is a diagram for describing a pen pressure determination threshold.

The pen pressure determination threshold T will be described in detail here. FIG. 5 is a diagram for describing the pen pressure determination threshold T. In FIG. 5, the horizontal axis indicates the passage of time t, and the vertical axis indicates the pen pressure level raw_P. This also applies to the drawings described later.

The event determination and threshold update circuit 43 includes a system reference value ST and a margin M1 as internal variables, in addition to the pen pressure determination threshold T. The system reference value ST is a value corresponding to the pen pressure level raw_P acquired in the state in which pressure is not applied to the pen nib of the pen 2. The margin M1 is a fixed value and is equal to a difference T-ST between the pen pressure determination threshold T and the system reference value ST. In other words, the pen pressure determination threshold T is always a value equal to the sum of the system reference value ST and M1 as illustrated in FIG. 5. Therefore, deriving or updating the pen pressure determination threshold T is equivalent to deriving or updating the system reference value ST.

Based on the definition of the system reference value ST, the system reference value ST is expected to be equal to the pen pressure level raw_P when pressure is not applied to the pen nib of the pen 2. FIG. 5 illustrates the expected state when t is smaller than t0. However, a certain ripple is usually generated in the pen pressure level raw_P as illustrated in FIG. 5, and the system reference value ST is a value equal to the average value of the pen pressure levels raw_P.

In the example of FIG. 5, the user performs the pen-down operation around time t0. As illustrated in FIG. 5, once the pen-down operation is performed, the pen pressure level raw_P rises accordingly. When the pen pressure level raw_P exceeds the pen pressure determination threshold T, the event determination and threshold update circuit 43 starts the pen-down event. The event is used to start rendering a line or the like based on the drawing application operated by the host processor 33.

Subsequently, when the pen pressure level raw_P falls below the pen pressure determination threshold T at time t1 as a result of the pen-up operation by the user, the event determination and threshold update circuit 43 starts the pen-up event. This ends the rendering of a line based on the drawing application.

In FIG. 5, it can be understood that the pen pressure level raw_P after time t1 is greater than the pen pressure level raw_P before time t0. Both are in the pen-up state, and the values are expected to be the same. Nevertheless, the values are not the same due to the hysteresis of the pen pressure detection circuit 22 described above. According to the technique of U.S. Patent Application Publication No. 2017-0131817, the system reference value ST can be calibrated in such a case. Specifically, the pen pressure level raw_P that is smaller than the current pen pressure determination threshold T and that is transitioning within a predetermined deviation (pen pressure level raw_P in an illustrated period P) can be statistically processed to derive the system reference value ST, and the margin M1 can be added to the result to derive the pen pressure determination threshold T. The calibration is also performed in the sensor controller 32 according to the present embodiment.

However, the calibration alone cannot solve various problems described above. According to the present embodiment, the first and second problems of the three problems are solved. Therefore, the first and second problems will be described in detail with reference to FIGS. 5 and 6, and then the action of the event determination and threshold update circuit 43 according to the present embodiment for solving the problems will be described in detail.

Figure 6:
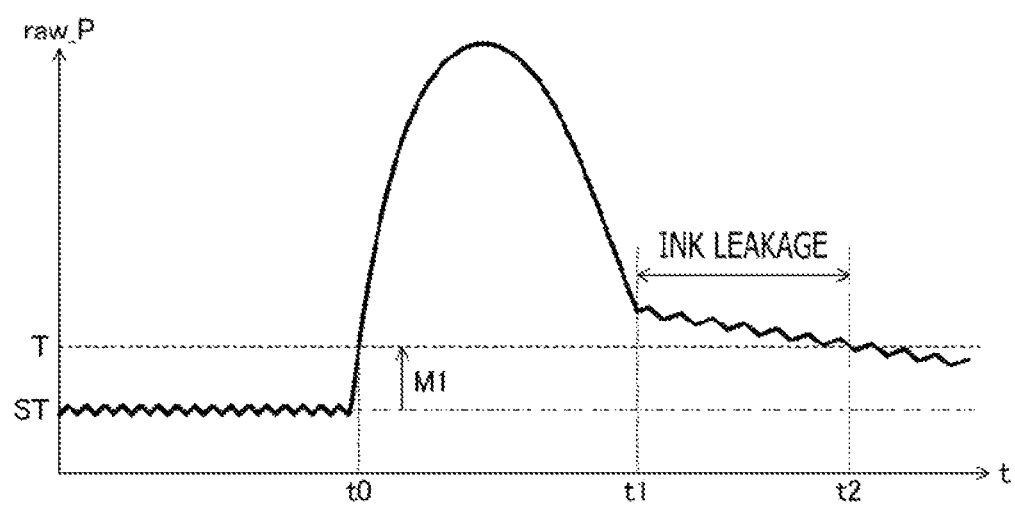
FIG. 6 is a diagram describing a first problem of the present disclosure.

FIG. 6 is a diagram describing the first problem. According to the hysteresis of the pen pressure detection circuit 22, the value of the pen pressure level raw_P does not immediately return to the original level after the user performs the pen-up operation at time t1. In this case, the pen pressure level raw_P may stay above the pen pressure determination threshold T for a while after time t1 as illustrated in FIG. 6 (until time t2 in FIG. 6). As a result, there is a time lag between the pen-up operation by the user and the generation of the pen-up event by the signal processing circuit 24, and the rendering by the host processor 33 continues during that time. This gives the user an impression that the ink is leaking (ink leakage phenomenon described above).

Figure 7:
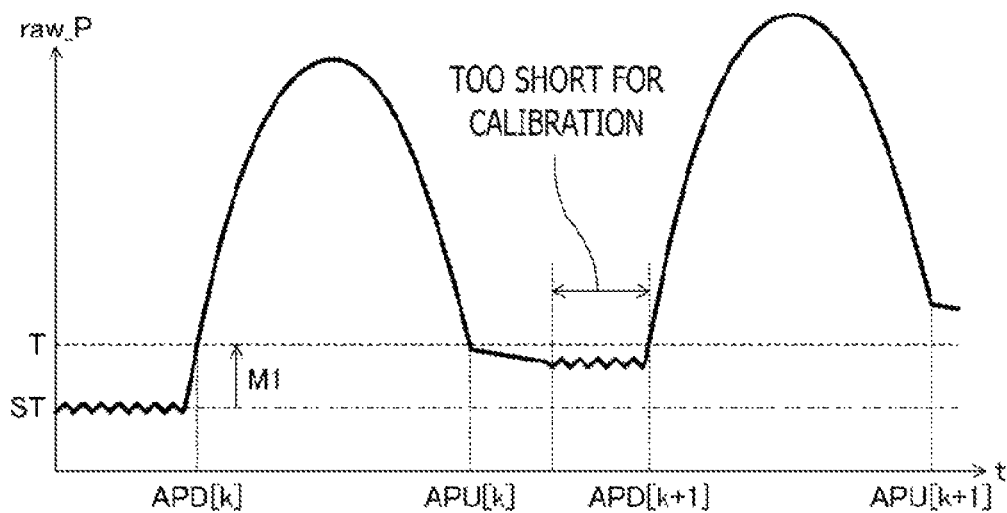
FIG. 7 is a diagram describing a second problem of the present disclosure.

FIG. 7 is a diagram describing the second problem. A certain number of samples of the pen pressure level raw_P are necessary for the calibration, and some time period (for example, period P illustrated in FIG. 5) is necessary. However, when the user quickly operates the pen, a sufficient number of samples may not be obtained before the next pen-down after the pen-up as in the example illustrated in FIG. 7. More specifically, a kth pen-down operation is performed at time APD[k], and a kth pen-up operation is performed at time APU[k] in FIG. 7. Subsequently, a (k+1)th pen-down operation is performed at time APD[k+1], and a (k+1)th pen-up operation is performed at time APU[k+1]. In this case, if the time period between time APU[k] and time APD[k+1] is short, the calibration cannot be performed within the period.

Figure 8:
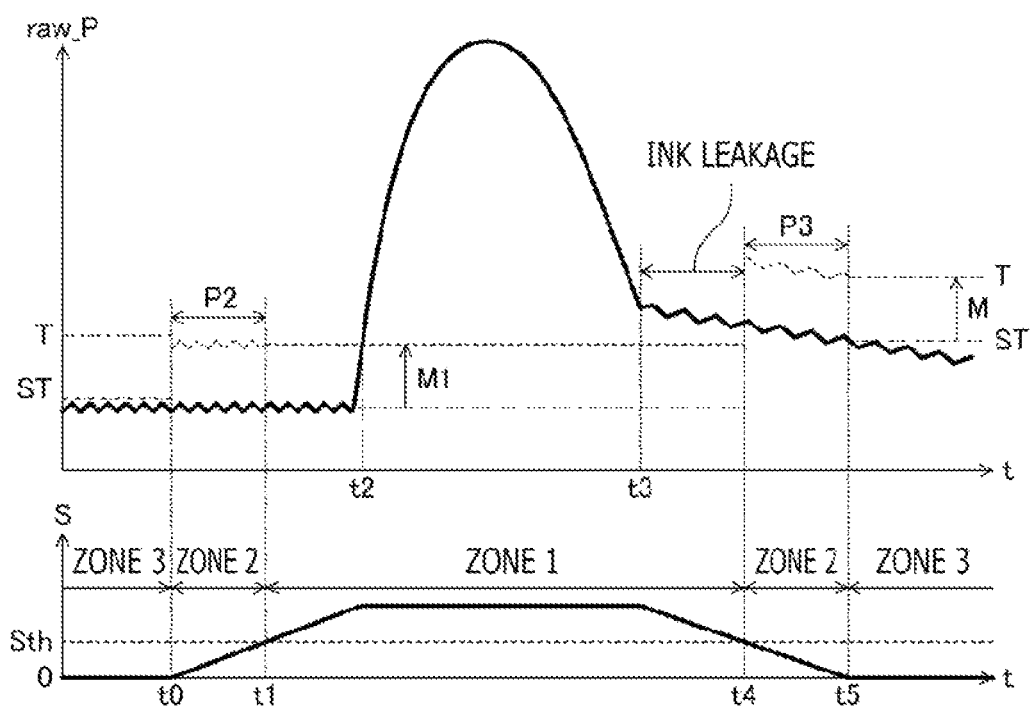
FIG. 8 depicts an action of an event determination and threshold update circuit illustrated in FIG. 2.

FIG. 8 depicts an action of the event determination and threshold update circuit 43 according to the present embodiment for solving the problems. The event determination and threshold update circuit 43 refers to the proximity S supplied from the proximity detection circuit 42 in addition to the pen pressure level raw_P in order to update the system reference value ST (pen pressure determination threshold T). Specifically, as illustrated in FIG. 8, the event determination and threshold update circuit 43 updates the system reference value ST (pen pressure determination threshold T) based on the pen pressure level raw_P when the proximity S indicates that the pen 2 is in the zone 2 illustrated in FIG. 3. Note that although the value of the pen pressure level raw_P is set as the system reference value ST in the example illustrated in FIG. 8, a moving average of the pen pressure level raw_P (average value of the pen pressure levels raw_P in a time period shorter than the time period necessary for the calibration) may be calculated, and the moving average may be set as the system reference value ST.

As a result of the update, the system reference value ST (pen pressure determination threshold T) can be updated based on one pen pressure level raw_P (without using statistics) acquired when the proximity S indicates that it is suitable for the update of the system reference value ST (pen pressure determination threshold T), and this can reduce the possibility of incompletion of the calibration before the next pen-down after the pen-up. In addition, when the proximity S acquired from the proximity detection circuit 42 indicates that the positional relationship between the pen 2 and the pen detection apparatus 34 satisfies a predetermined relationship (specifically, the pen 2 is not in contact with the panel surface 3t), the system reference value ST (pen pressure determination threshold T) can be immediately updated, and the effect of the ink leakage phenomenon can be reduced.

Figure 9:
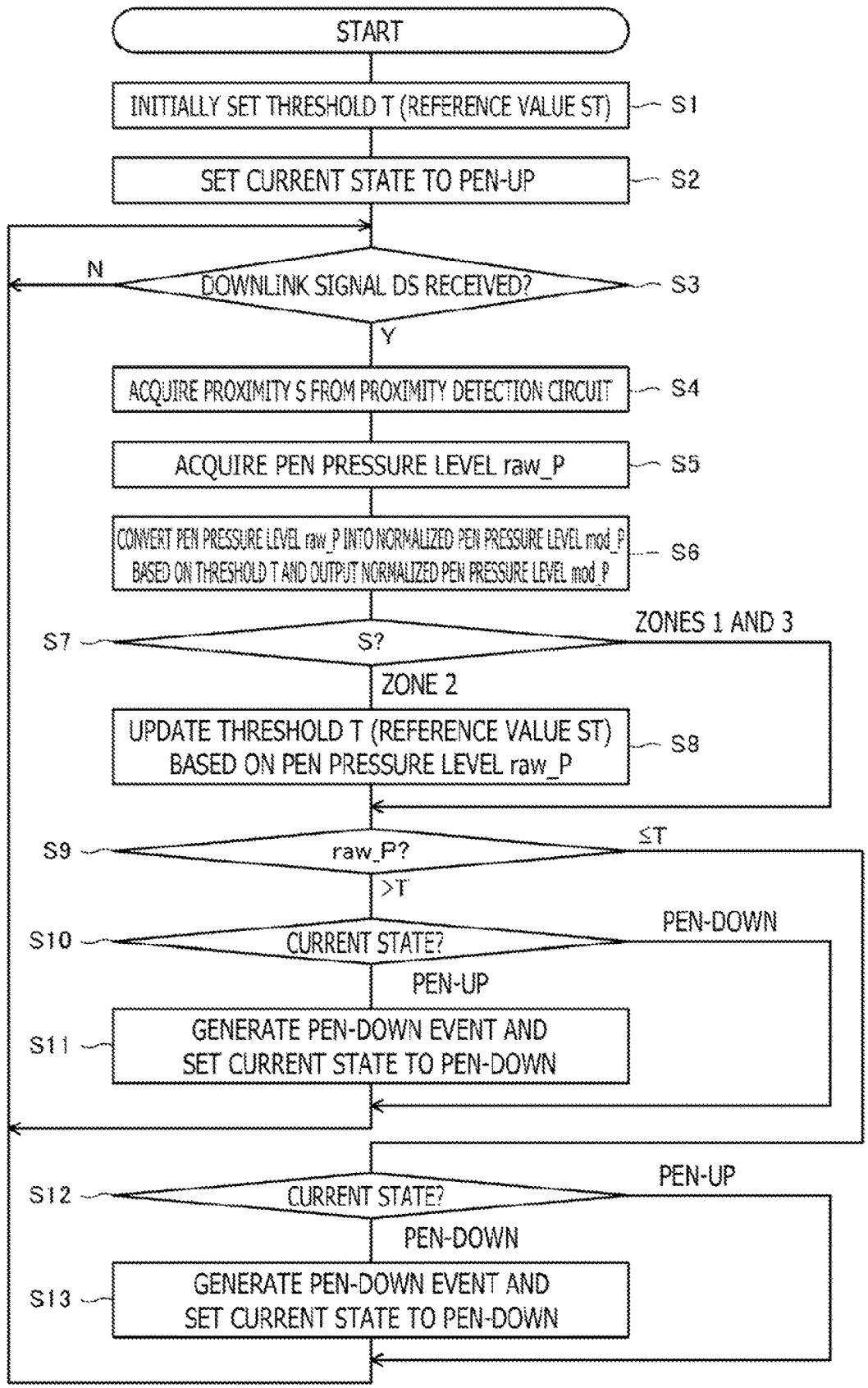
FIG. 9 is a flow chart illustrating a processing flow of a process performed by the event determination and threshold update circuit illustrated in FIG. 2.

FIG. 9 is a flow diagram illustrating a processing flow of a process performed by the event determination and threshold update circuit 43. The action of the event determination and threshold update circuit 43 according to the present embodiment will be described in more detail with reference to FIG. 9.

As illustrated in FIG. 9, the event determination and threshold update circuit 43 first initially sets the pen pressure determination threshold T (system reference value ST) (S1) and sets the current state to the pen-up (S2).

Next, the event determination and threshold update circuit 43 determines whether the downlink signal DS is received (S3). If the event determination and threshold update circuit 43 determines that the downlink signal DS is not received at S3, the event determination and threshold update circuit 43 returns to S3 to repeat the determination process. On the other hand, if the event determination and threshold update circuit 43 determines that the downlink signal DS is received at S3, the event determination and threshold update circuit 43 acquires the proximity S from the proximity detection circuit 42 (S4) and decodes the data signal to acquire the pen pressure level raw_P (S5). The event determination and threshold update circuit 43 then converts the pen pressure level raw_P into the normalized pen pressure level mod_P (see FIG. 4) based on the pen pressure determination threshold T and outputs the normalized pen pressure level mod_P to the host processor 33 (S6).

Subsequently, the event determination and threshold update circuit 43 determines, based on the acquired proximity S, one of the zones 1 to 3 illustrated in FIG. 3 in which the pen 2 that has transmitted the downlink signal DS exists (S7). As a result, if the event determination and threshold update circuit 43 determines that the pen 2 is in the zone 2 (that is, the downlink signal DS can be received, and it is guaranteed that the pen 2 is not in contact with the panel surface 3t), the event determination and threshold update circuit 43 updates the pen pressure determination threshold T (system reference value ST) based on the pen pressure level raw_P acquired at S5 (S8). Specifically, the event determination and threshold update circuit 43 updates the system reference value ST based on the pen pressure level raw_P acquired at S5 and adds the margin M1 to the updated system reference value ST to calculate the pen pressure determination threshold T.

Next, the event determination and threshold update circuit 43 compares the pen pressure level raw_P acquired at S5 and the pen pressure determination threshold T (S9). If a result indicating that the pen pressure level raw_P is greater than the pen pressure determination threshold T is obtained, the event determination and threshold update circuit 43 first determines which one of the pen-up and the pen-down is the current state (S10). As a result, if the event determination and threshold update circuit 43 determines that the current state is the pen-up, the event determination and threshold update circuit 43 generates the pen-down event and sets the current state to the pen-down (S11). The setting process includes a process of outputting the data indicating the generation of the pen-down event to the host processor 33. The event determination and threshold update circuit 43 that has finished the process of S11 returns to S3 and waits for the next timing. On the other hand, the event determination and threshold update circuit 43 that has determined that the current state is the pen-down at S10 skips the process of S11 and returns the process to S3.

The event determination and threshold update circuit 43 that has obtained a result indicating that the pen pressure level raw_P is equal to or smaller than the pen pressure determination threshold T as a result of the comparison at S8 first determines which one of the pen-up and the pen-down is the current state (S12). If the event determination and threshold update circuit 43 determines that the current state is the pen-down, the event determination and threshold update circuit 43 generates the pen-up event and sets the current state to the pen-up (S13). The setting process includes a process of outputting the data indicating the generation of the pen-up event to the host processor 33. The event determination and threshold update circuit 43 that has finished the process of S13 returns to S3 and waits for the next timing. On the other hand, the event determination and threshold update circuit 43 that has determined that the current state is the pen-up at S12 skips the process of S13 and returns the process to S3.

As described, according to the first embodiment of the present disclosure, the pen pressure determination threshold T can be updated based on one pen pressure level raw_P (without using statistics) acquired at an appropriate time (specifically, when the pen 2 is in the zone 2), and this can reduce the possibility of incompletion of the calibration before the next pen-down after the pen-up. In addition, when the proximity S acquired from the proximity detection circuit 42 indicates that the positional relationship between the pen 2 and the pen detection apparatus 34 satisfies a predetermined relationship (specifically, when the pen 2 is in the zone 2), the pen pressure determination threshold T can be immediately updated, and the effect of the ink leakage phenomenon can be reduced.

Note that although the proximity detection circuit 42 is provided in the sensor controller 32 in the example described in the present embodiment, the proximity detection circuit may be provided in the signal processing circuit 24 of the pen 2. In this case, it is suitable to use, as the proximity S, the reception strength of the uplink signal US received through the electrode 21 illustrated in FIG. 1. Specifically, it is suitable to use, for example, the magnitude of the current generated in the tablet alternating magnetic field as the proximity S in an electromagnetic induction pen 2, and it is suitable to use, for example, the amount of charge induced in the electrode 21 as the proximity S in an active electrostatic pen 2.

In other words, the proximity detection circuit can generate the proximity S based on the reception strength on the reception side of the signal transmitted and received between the pen 2 and the pen detection apparatus 34. However, the proximity detection circuit can also generate the proximity S based on information other than the reception strength on the reception side of the signal transmitted and received between the pen 2 and the pen detection apparatus 34. For example, the proximity detection circuit may generate the proximity S based on a detection result of the capacitance generated between the electrode 21 and the sensor electrode of the sensor 31 or based on a pressed state of the switch 23. The proximity detection circuit may also generate the proximity S based on an image of the panel surface 3t imaged by an image sensor provided on the pen 2 or may generate the proximity S based on a result of echolocation performed by sonar provided on the pen. The proximity detection circuit may also generate the proximity S based on two or more of these pieces of information.

In addition, the functions of the event determination and threshold update circuit 43 may be provided on the pen 2 instead of the sensor controller 32. In this case, the signal processing circuit 24 of the pen 2 preferably uses the downlink signal DS to transmit the data indicating the generation of the pen-down event and the pen-up event toward the sensor controller 32.

In addition, the sensor controller 32 may be capable of detecting a plurality of the pens 2 provided with different pen IDs, and in this case, the sensor controller 32 receives different pen IDs from the plurality of the pens 2. Therefore, the event determination and threshold update circuit 43 may hold the pen pressure determination threshold T and the system reference value ST for each of the received pen IDs and may update them based on the corresponding pen pressure level raw_P.

Next, the position detection system 1 according to a second embodiment of the present disclosure will be described. The basic configuration of the position detection system 1 according to the present embodiment is similar to the basic configuration illustrated in FIGS. 1 and 2. However, the proximity detection circuit 42 may not be provided. The present embodiment is different from the first embodiment in that the event determination and threshold update circuit 43 uses two types of pen pressure determination thresholds. An action of the event determination and threshold update circuit 43 according to the present embodiment will now be described in detail.

Figure 10:
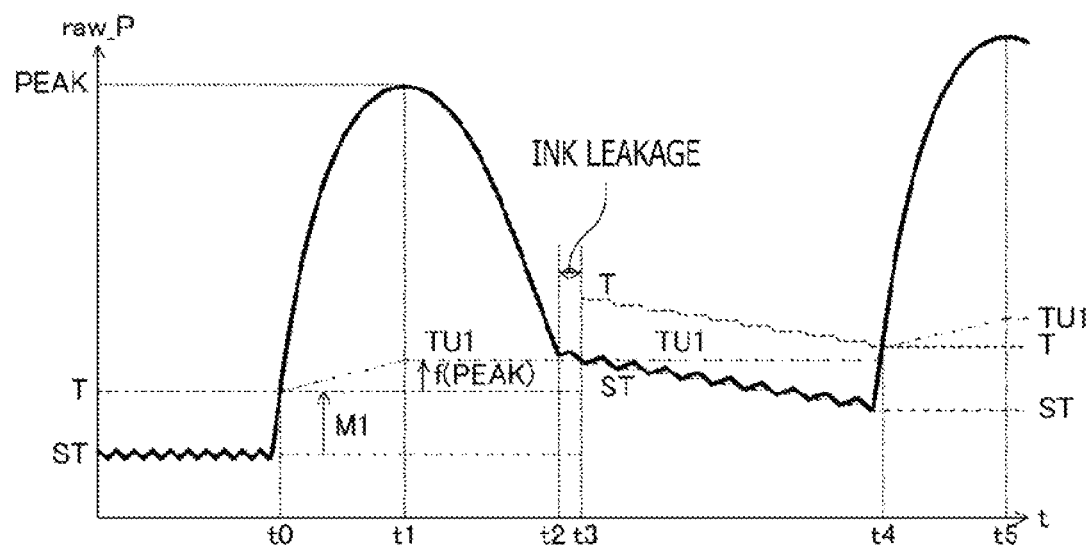
FIG. 10 depicts an action of the event determination and threshold update circuit according to a second embodiment of the present disclosure.

FIG. 10 depicts the action of the event determination and threshold update circuit 43 according to the present embodiment. The event determination and threshold update circuit 43 according to the present embodiment uses the pen pressure determination threshold T (first threshold) described in the first embodiment as well as an auxiliary threshold TU1 (second threshold) different from the pen pressure determination threshold T. The event determination and threshold update circuit 43 is configured to generate the pen-down event as described in the first embodiment and then calculate the auxiliary threshold TU1 as a value greater than the pen pressure determination threshold T.

The following Equation (2) is an example of a specific calculation formula of the auxiliary threshold TU1. Here, f(PEAK) is a function of a peak value PEAK of the pen pressure level raw_P (maximum value of the pen pressure level raw_P detected when the pen 2 is in the pen-down state). The larger the peak value PEAK, the larger f(PEAK). The event determination and threshold update circuit 43 generates the pen-down event and then periodically acquires the pen pressure level raw_P to acquire the maximum value of the pen pressure level raw_P after the generation of the pen-down event. The event determination and threshold update circuit 43 is configured to assign the acquired maximum value as the peak value PEAK to Equation (2) to calculate the auxiliary threshold TU1.

$$TU1 = T + f(PEAK) \quad (2)$$

The calculated auxiliary threshold TU1 rises as the pen pressure level raw_P continues to rise and becomes a fixed value once after the pen pressure level raw_P becomes maximum as illustrated in FIG. 10. The event determination and threshold update circuit 43 uses the calculated auxiliary threshold TU1 to detect the pen-up operation. That is, the event determination and threshold update circuit 43 is configured to generate the pen-up event based on the comparison result of the pen pressure level raw_P and the auxiliary threshold TU1.

Figure 11:
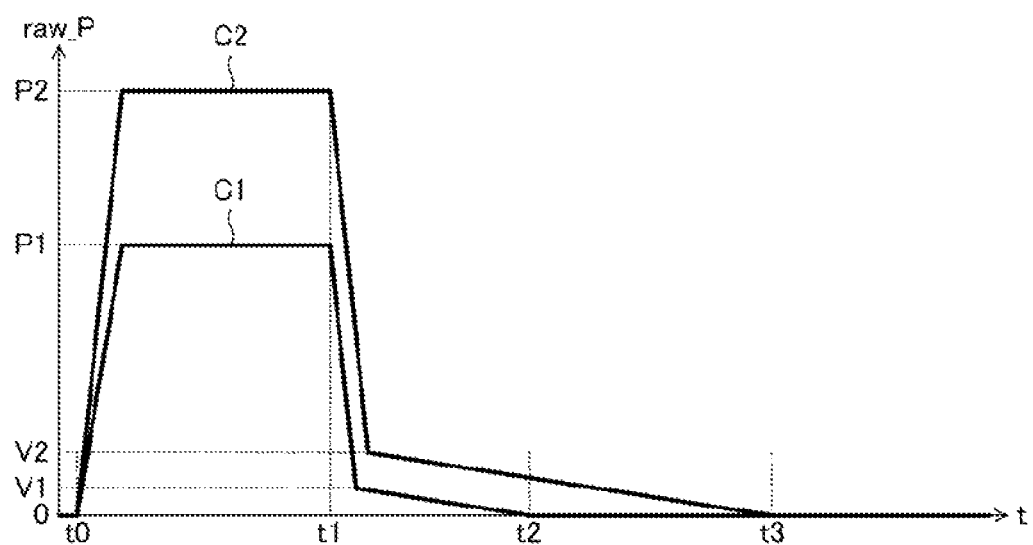
FIG. 11 schematically depicts changes in the pen pressure level in a case where a value of a peak value is P1 and in a case where the value is P2 (>P1)

Here, the meaning of Equation (2) will be described in detail. FIG. 11 schematically depicts changes in the pen pressure level raw_P in a case where the value of the peak value PEAK is P1 and in a case where the value of the peak value PEAK is P2 (>P1). In FIG. 11, a curve C1 indicates the case where the value of the peak value PEAK is P1, and a curve C2 indicates the case where the value of the peak value PEAK is P2. In both of the curves C1 and C2, the pen-down operation is generated at time t0, and the pen-up operation is generated at time t1.

The pen pressure level raw_P after the pen-up operation by the user rapidly falls down once, and then, slowly approaches zero as can be understood from FIG. 11. The minimum values at the time of the rapid drop vary between the curve C1 and the curve C2. More specifically, a minimum value V2 of the curve C2 with a relatively large peak value PEAK is a value greater than a minimum value V1 of the curve C1 with a relatively small peak value PEAK. The time periods required for the pen pressure level raw_P to return to zero also vary between the curve C1 and the curve C2. More specifically, a return time period t3−t1 of the curve C2 with a relatively large peak value PEAK is a value greater than a return time period t2−t1 of the curve C1 with a relatively small peak value PEAK. Therefore, it can be understood that the auxiliary threshold TU1 used for detecting the pen-up operation can be set to a larger value for a larger peak value PEAK in order to quickly generate the pen-up event after the pen-up operation while avoiding false detection of the pen-up operation. Equation (2) formulates this.

Therefore, according to the present embodiment, it can be stated that the pen-down event and the pen-up event can be appropriately generated without using the hysteresis of the pen pressure detection circuit 22. Therefore, as also illustrated in FIG. 10, the ink leakage phenomenon can be eliminated earlier than in the case of generating the pen-up event based on the pen pressure determination threshold T.

Note that the auxiliary threshold TU1 may be calculated based on the length of the time period in which the pen 2 is in the pen-down state, instead of the peak value PEAK of the pen pressure level raw_P. This will now be described in detail.

Figure 12:
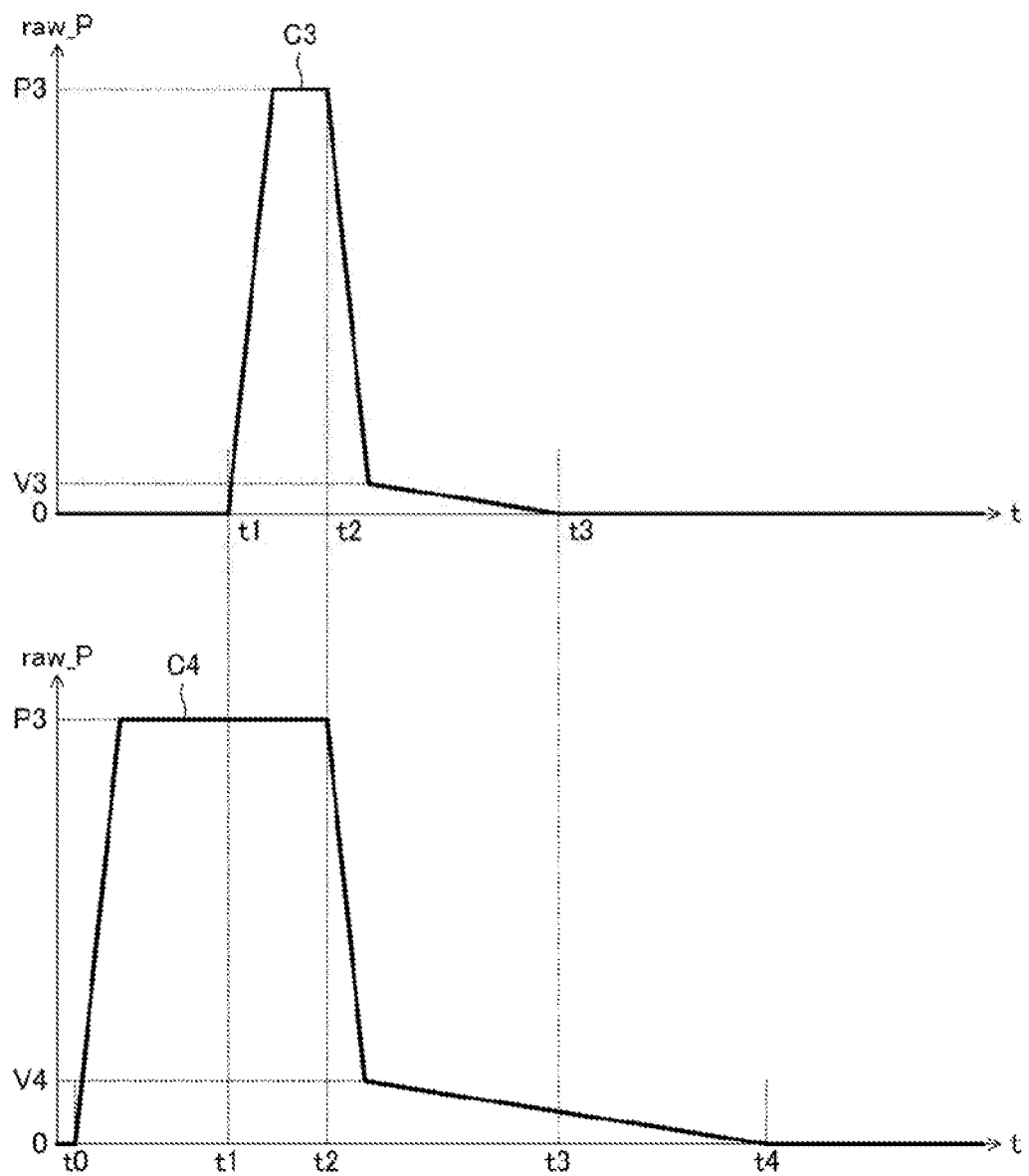
FIG. 12 schematically depicts changes in the pen pressure level in a case where a time period that the pen is in a pen-down state is t2−t1 and in a case where the time period is t2−t0 (t0<t1)

FIG. 12 schematically depicts changes in the pen pressure level raw_P in a case where the time period that the pen 2 is in the pen-down state is t2−t1 and in a case where the time period is t2−t0 (t0<t1). In FIG. 12, a curve C3 indicates the case where the time period of the pen-down state is t2−t1, and a curve C4 indicates the case where the time period of the pen-down state is t2−t0. The time of the generation of the pen-up operation is time t2 in both of the curves C3 and C4.

The pen pressure level raw_P after the pen-up operation by the user also rapidly falls down once, and then, slowly approaches zero in this case. The minimum values at the time of the rapid drop vary between the curve C3 and the curve C4. More specifically, a minimum value V4 of the curve C4 with a relatively long pen-down time period is a value greater than a minimum value V3 of the curve C3 with a relatively short pen-down time period. The time periods required for the pen pressure level raw_P to return to zero also vary between the curve C3 and the curve C4. More specifically, a return time period t4−t2 of the curve C4 with a relatively long pen-down time period is a value greater than a return time period t3–t2 of the curve C3 with a relatively short pen-down time period. Therefore, it can be understood that the auxiliary threshold TU1 used for detecting the pen-up operation can be set to a larger value for a larger length of the time period of the pen-down state in order to quickly generate the pen-up event after the pen-up operation while avoiding false detection of the pen-up operation.

The following Equation (3) represents a calculation formula of the auxiliary threshold TU1 that can be used in this case. Here, f(L) is a function of duration L of the pen-down state. The larger the duration L, the larger f(L).

$$TU1=T+f(L) \quad (3)$$

In the second embodiment, the pen-down event may be generated just after the generation of the pen-up event if only the auxiliary threshold TU1 is used. This is because the pen pressure level raw_P just after falling below the auxiliary threshold TU1 is usually a value exceeding the pen pressure determination threshold T. Therefore, it is preferable that the event determination and threshold update circuit 43 according to the present embodiment further perform a process of setting the pen pressure determination threshold T to a value greater than the auxiliary threshold TU1 according to the generation of the pen-up event. This will now be described in detail with reference again to FIG. 10.

As illustrated in FIG. 10, at time t3 of the generation of the pen-up event, the event determination and threshold update circuit 43 performs a process of updating the system reference value ST based on the pen pressure level raw_P at the time. Accordingly, the pen pressure determination threshold T is also updated. The event determination and threshold update circuit 43 then uses the pen pressure level raw_P at the time to update the system reference value ST and the pen pressure determination threshold T when the pen pressure level raw_P falls below the system reference value ST. In this way, the generation of the pen-down event can be avoided unless there is a large rebound of the pen pressure level raw_P. Note that when there is a large rebound of the pen pressure level raw_P, the pen pressure level raw_P exceeds the pen pressure determination threshold T as illustrated at time t4 in FIG. 10, and the pen-down event is generated.

Figure 13:
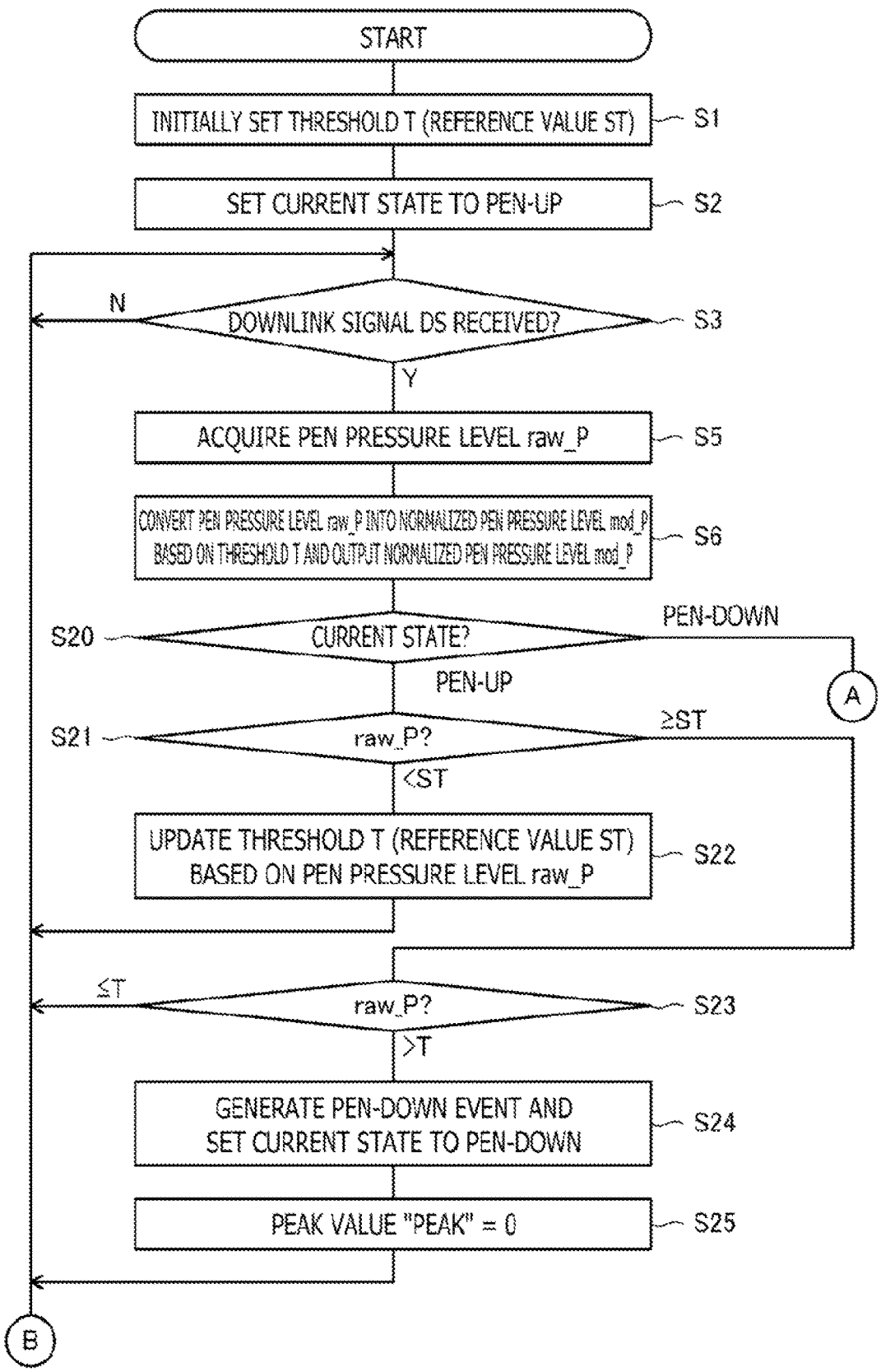
FIG. 13 is a flow diagram illustrating a processing flow of a process performed by the event determination and threshold update circuit according to the second embodiment of the present disclosure.
Figure 14:
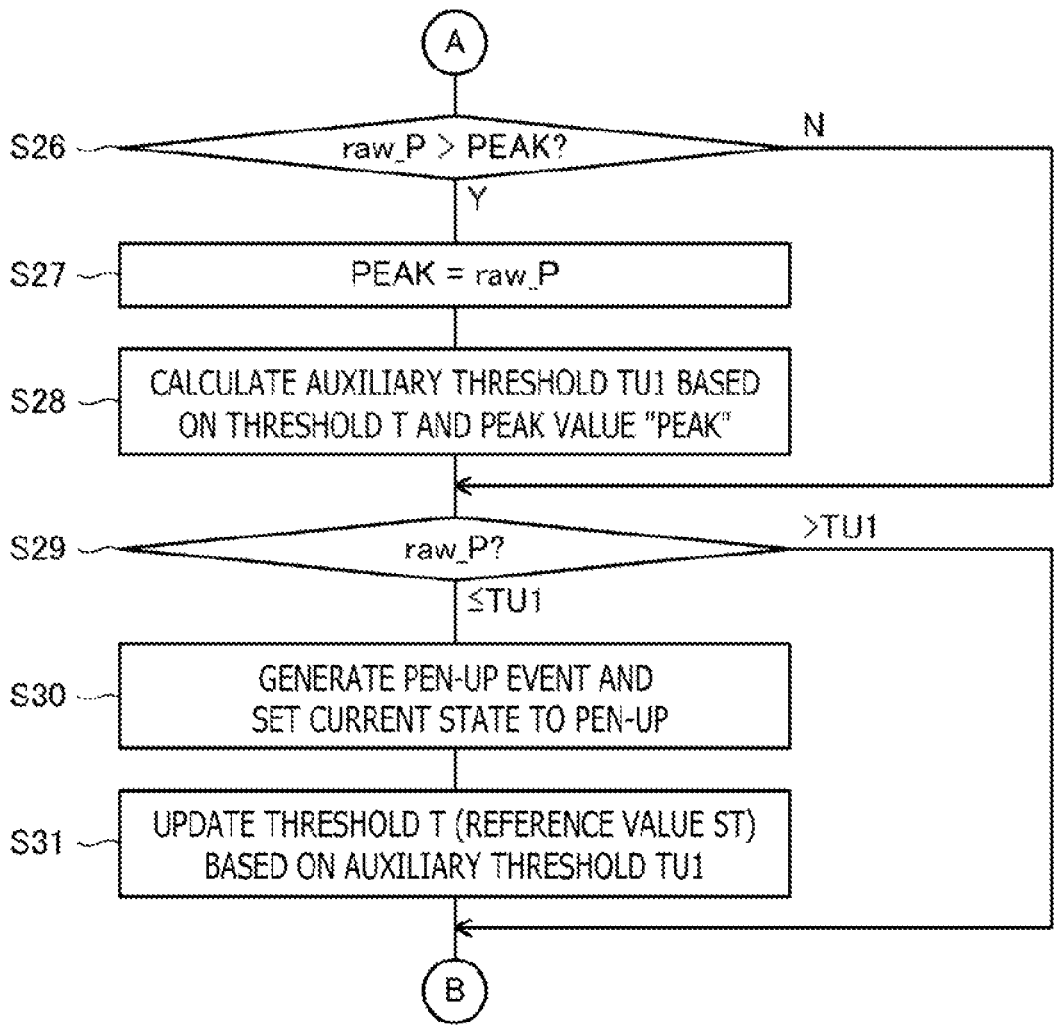
FIG. 14 is a flow diagram illustrating the processing flow of the process performed by the event determination and threshold update circuit according to the second embodiment of the present disclosure.

FIGS. 13 and 14 are flow diagrams illustrating a processing flow of the process performed by the event determination and threshold update circuit 43. The action of the event determination and threshold update circuit 43 according to the present embodiment will be described in more detail with reference to the drawings.

The processes of S1 to S6 are similar to the processes in the first embodiment. However, S4 may be skipped (not illustrated in FIGS. 13 and 14). After S6, the event determination and threshold update circuit 43 determines which one of the pen-up and the pen-down is the current state (S20). As a result, if the event determination and threshold update circuit 43 determines that the current state is the pen-up, the event determination and threshold update circuit 43 then compares the pen pressure level raw_P acquired at S5 and the system reference value ST (S21). If the pen pressure level raw_P is smaller than the system reference value ST, the event determination and threshold update circuit 43 updates the system reference value ST based on the pen pressure level raw_P. Specifically, the event determination and threshold update circuit 43 uses the pen pressure level raw_P acquired at S5 to update the system reference value ST. In this case, the pen pressure determination threshold T is also updated according to the update of the system reference value ST. The event determination and threshold update circuit 43 that has updated the system reference value ST and the pen pressure determination threshold T returns the process to S3.

On the other hand, the event determination and threshold update circuit 43 that has determined that the pen pressure level raw_P is equal to or greater than the system reference value ST at S22 compares the pen pressure level raw_P and the pen pressure determination threshold T (S23). If a result indicating that the pen pressure level raw_P is greater than the pen pressure determination threshold T is obtained, the event determination and threshold update circuit 43 generates the pen-down event and sets the current state to the pen-down (S24). The details of the process are similar to those of S11 illustrated in FIG. 9. Subsequently, the event determination and threshold update circuit 43 sets the peak value PEAK as an internal variable to 0 (S25) and returns the process to S3.

The event determination and threshold update circuit 43 that has determined that the current state is the pen-down at S20 compares the pen pressure level raw_P acquired at S5 and the peak value PEAK as illustrated in FIG. 14 (S26). As a result, if the pen pressure level raw_P is greater than the peak value PEAK, the event determination and threshold update circuit 43 sets the pen pressure level raw_P to the peak value PEAK (S27) and then calculates the auxiliary threshold TU1 based on the pen pressure determination threshold T and the peak value PEAK (S28). The event determination and threshold update circuit 43 uses, for example, Equation (2) described above to execute the calculation.

After the end of S28 or when the event determination and threshold update circuit 43 determines that the pen pressure level raw_P is not greater than the peak value PEAK at S26, the event determination and threshold update circuit 43 compares the pen pressure level raw_P and the auxiliary threshold TU1 (S29). If a result indicating that the pen pressure level raw_P is equal to or smaller than the auxiliary threshold TU1 is obtained, the event determination and threshold update circuit 43 generates the pen-up event and sets the current state to the pen-up (S30). The details of the process are similar to those of S13 illustrated in FIG. 9. Subsequently, the event determination and threshold update circuit 43 updates the system reference value ST and the pen pressure determination threshold T based on the auxiliary threshold TU1 (S31) and returns the process to S3. Although S31 is a process of setting the pen pressure determination threshold T to a value greater than the auxiliary threshold TU1 in the specific example, S31 may be a process of setting the system reference value ST to a value greater than the auxiliary threshold TU1.

As described, according to the second embodiment of the present disclosure, the pen-down event and the pen-up event can be appropriately generated without using the hysteresis of the pen pressure detection circuit 22, and the ink leakage phenomenon can be eliminated early.

Next, the position detection system 1 according to the third embodiment of the present disclosure will be described. The basic configuration of the position detection system 1 according to the present embodiment is similar to the basic configuration illustrated in FIGS. 1 and 2 except that the proximity detection circuit 42 and the event determination and threshold update circuit 43 are provided in the signal processing circuit 24 of the pen 2. However, the proximity detection circuit 42 may not be provided. In addition to this, the present embodiment is different from the first embodiment in that the event determination and threshold update circuit 43 is triggered by the generation of the pen-down event to update the pen pressure determination threshold. An action of the event determination and threshold update circuit 43 according to the present embodiment will now be described in detail.

Figure 15:
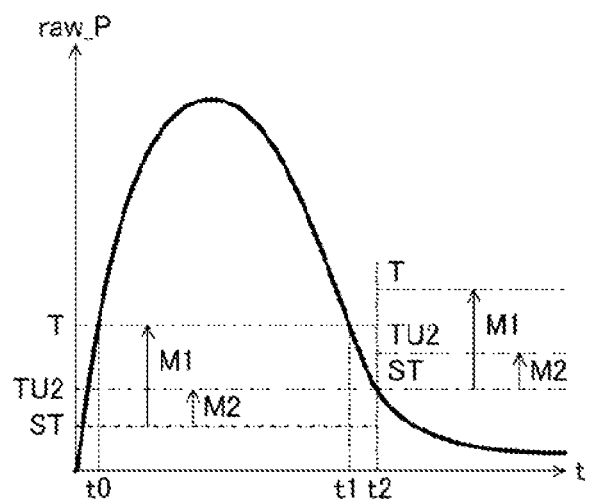
FIG. 15 depicts an action of the event determination and threshold update circuit according to a third embodiment of the present disclosure.

FIG. 15 depicts the action of the event determination and threshold update circuit 43 according to the present embodiment. The event determination and threshold update circuit 43 according to the present embodiment uses the pen pressure determination threshold T (first threshold) described in the first embodiment as well as an auxiliary threshold TU2 (first auxiliary threshold) including a value smaller than the pen pressure determination threshold T. Specifically, the event determination and threshold update circuit 43 adds a margin M2 (<M1) to the system reference value ST and uses the value as the auxiliary threshold TU2 as illustrated in FIG. 15.

The event determination and threshold update circuit 43 performs a process similar to the process of the event determination and threshold update circuit 43 according to the first embodiment to generate the pen-down event and is triggered by the generation of the pen-down event to update the pen pressure determination threshold T. Specifically, the event determination and threshold update circuit 43 is configured to update the pen pressure determination threshold T when the pen pressure level raw_P falls below the auxiliary threshold TU2 after the generation of the pen-down event. The event determination and threshold update circuit 43 also generates a (k+1)th pen-down event based on a comparison result of the pen pressure level raw_P and the updated pen pressure determination threshold T, in which the update is triggered by the generation of a kth pen-down event.

The event determination and threshold update circuit 43 can perform the action to update the pen pressure determination threshold T once for each pen-down as illustrated in FIG. 15. As described above, it can be stated that in the hysteresis, particularly the mechanical hysteresis, the loading and unloading in the cycle from the last pen-down operation to the pen-up operation change the force response characteristics of the loading and unloading in the next cycle. Therefore, it is desirable to execute the calibration for each cycle in which the loading and unloading occur, and according to the present embodiment, it can be stated that the pen pressure determination threshold T can be calibrated at the right time. The pen pressure determination threshold T can also be updated even when the calibration that takes a long time as in the calibration described in U.S. Patent Application Publication No. 2017-0131817 cannot be performed, such as when the user quickly operates the pen 2.

Figure 16:
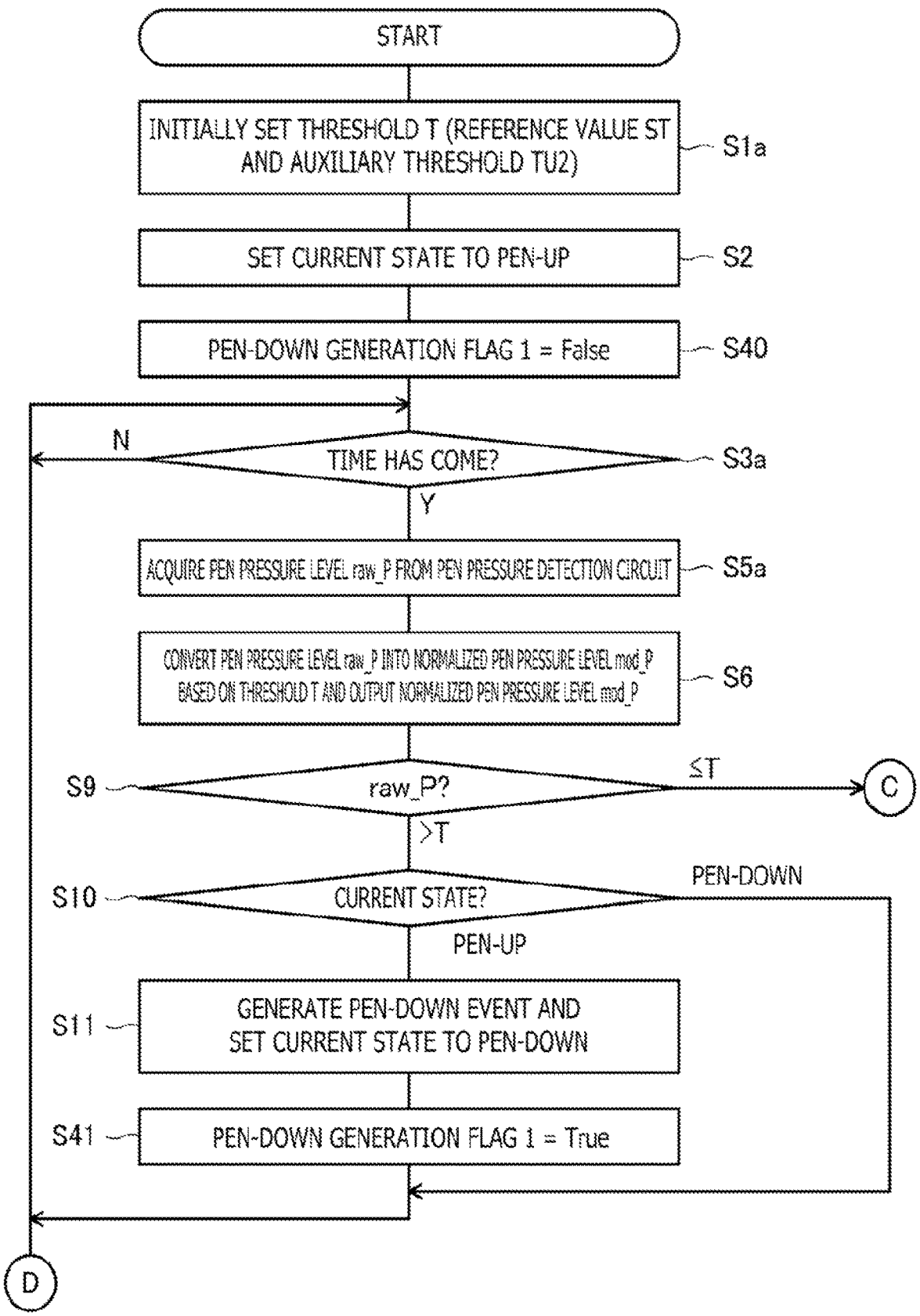
FIG. 16 is a flow diagram illustrating a processing flow of a process performed by the event determination and threshold update circuit according to the third embodiment of the present disclosure.
Figure 17:
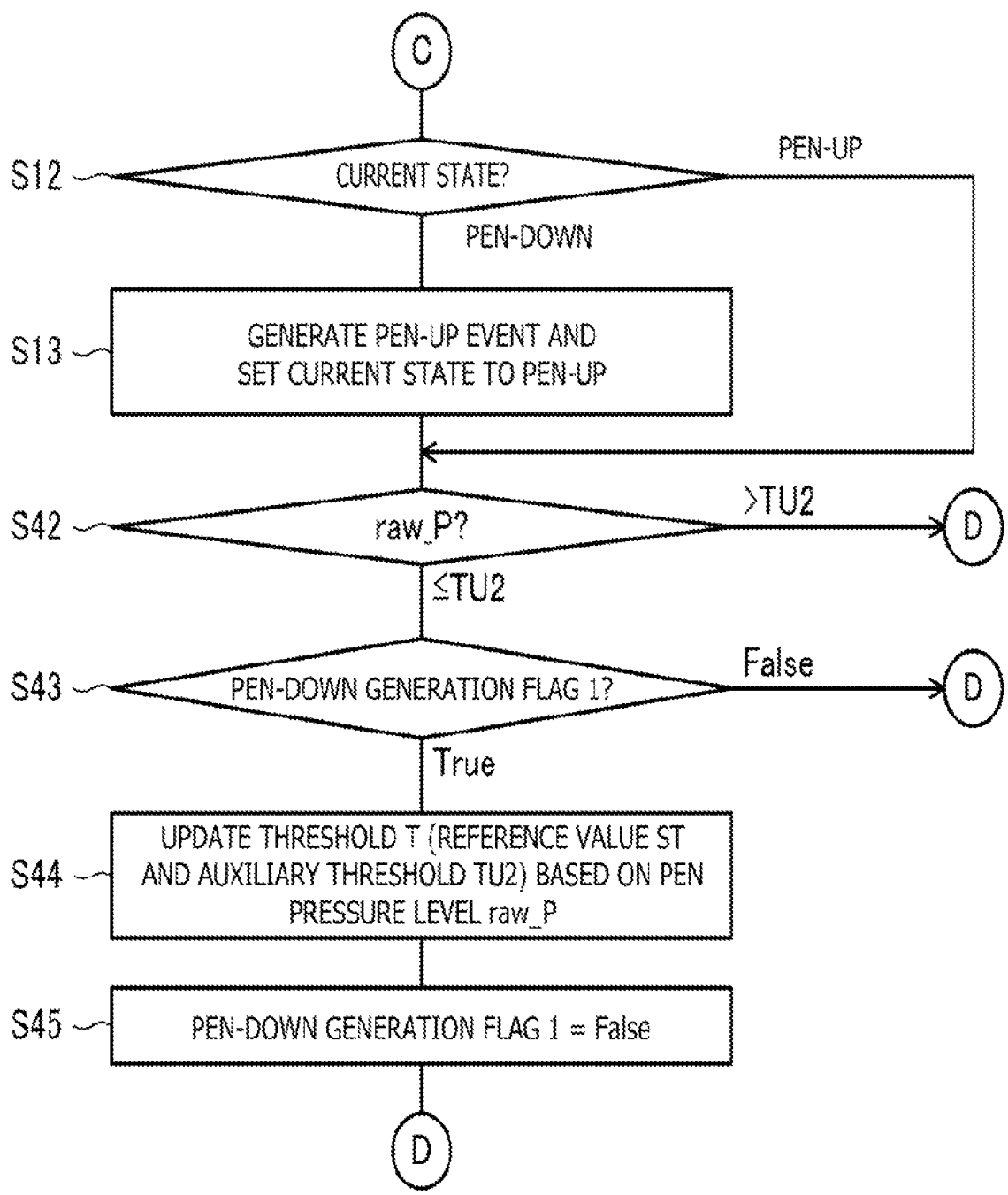
FIG. 17 is a flow diagram illustrating the processing flow of a process performed by the event determination and threshold update circuit according to the third embodiment of the present disclosure.

FIGS. 16 and 17 are flow diagrams illustrating a processing flow of the process performed by the event determination and threshold update circuit 43 according to the present embodiment. The action of the event determination and threshold update circuit 43 according to the present embodiment will now be described in more detail with reference to the drawings.

The event determination and threshold update circuit 43 according to the present embodiment initially sets the pen pressure determination threshold T (system reference value ST and auxiliary threshold TU2) (S1$a$). Note that as described above, the auxiliary threshold TU2 is always a value equal to the sum of the system reference value ST and M2. Therefore, as in the case of the pen pressure determination threshold T, the derivation and the update of the auxiliary threshold TU2 are equivalent to the derivation and the update of the system reference value ST.

Among the subsequent processes, the processes of S2 to S13 are performed in the same way as in the first embodiment. However, S4, S7, and S8 (see FIG. 9) regarding the proximity S may be skipped (not illustrated in FIGS. 16 and 17). In addition, S3 and S5 are replaced by S3$a$ and S5$a$, respectively, and performed. S3$a$ is a process of determining whether it is time to acquire the pen pressure level raw_P from the pen pressure detection circuit 22. The timing may be periodically generated or may be generated when the uplink signal US is received from the sensor controller 32. In the latter case, the subsequent processes are performed only when the pen 2 is near the sensor controller 32, and the decrease in the power source 25 can be delayed. S5$a$ is different from S5 in that the pen pressure level raw_P is acquired by receiving an input from the pen pressure detection circuit 22 instead of by decoding the data signal.

The event determination and threshold update circuit 43 also sets a pen-down generation flag 1, which is for temporarily storing the fact that the pen-down is generated, to False between S2 and S3 (S40). The event determination and threshold update circuit 43 sets the pen-down generation flag 1 to True after generating the pen-down event at S11 (S41).

The event determination and threshold update circuit 43 according to the present embodiment further determines whether the pen pressure level raw_P is equal to or smaller than the auxiliary threshold TU2 as illustrated in FIG. 17 if the event determination and threshold update circuit 43 determines that the pen pressure level raw_P is equal to or smaller than the pen pressure determination threshold T at S9 (S42). Note that S12 and S13 also illustrated in FIG. 9 can be performed after the determination indicating that the pen pressure level raw_P is equal to or smaller than the pen pressure determination threshold T at S9, before the execution of S42, as illustrated in FIG. 17.

If the event determination and threshold update circuit 43 determines that the pen pressure level raw_P is not equal to or smaller than the auxiliary threshold TU2 at S42, the event determination and threshold update circuit 43 returns the process to S3. On the other hand, at S42, the event determination and threshold update circuit 43 that has determined that the pen pressure level raw_P is equal to or smaller than the auxiliary threshold TU2 first determines whether the pen-down generation flag 1 is True. As a result, if the event determination and threshold update circuit 43 determines that the pen-down generation flag 1 is False, the event determination and threshold update circuit 43 returns the process to S3. On the other hand, if the event determination and threshold update circuit 43 determines that the pen-down generation flag 1 is True, the event determination and threshold update circuit 43 performs an update process of the pen pressure determination threshold T (system reference value ST and auxiliary threshold TU2) based on the pen pressure level raw_P (S44, first update). Specifically, the event determination and threshold update circuit 43 uses the pen pressure level raw_P acquired at S5 to update the system reference value ST as illustrated in FIG. 15. The event determination and threshold update circuit 43 also adds the margins M1 and M2 to the updated system reference value ST to calculate the pen pressure determination threshold T and the auxiliary threshold TU2. The event determination and threshold update circuit 43 then sets the pen-down generation flag 1 to False (S45) and returns the process to S3.

As described, according to the third embodiment of the present disclosure, the pen pressure determination threshold T can be updated once for each pen-down. Therefore, the pen pressure determination threshold T can be calibrated at the right time. The pen pressure determination threshold T can also be updated even when the calibration that takes a long time as in the calibration described in U.S. Patent Application Publication No. 2017-0131817 cannot be performed, such as when the user quickly operates the pen 2.

Note that although the generation of the pen-down event triggers the update of the pen pressure determination threshold T (system reference value ST and auxiliary threshold TU2) based on the latest pen pressure level raw_P in the present embodiment, the generation of the pen-down event may trigger the execution of the calibration process as disclosed in U.S. Patent Application Publication No. 2017-0131817. A combination of these may also be performed. A modification of the present embodiment regarding the combination will now be described in detail with reference to the drawings.

Figure 18:
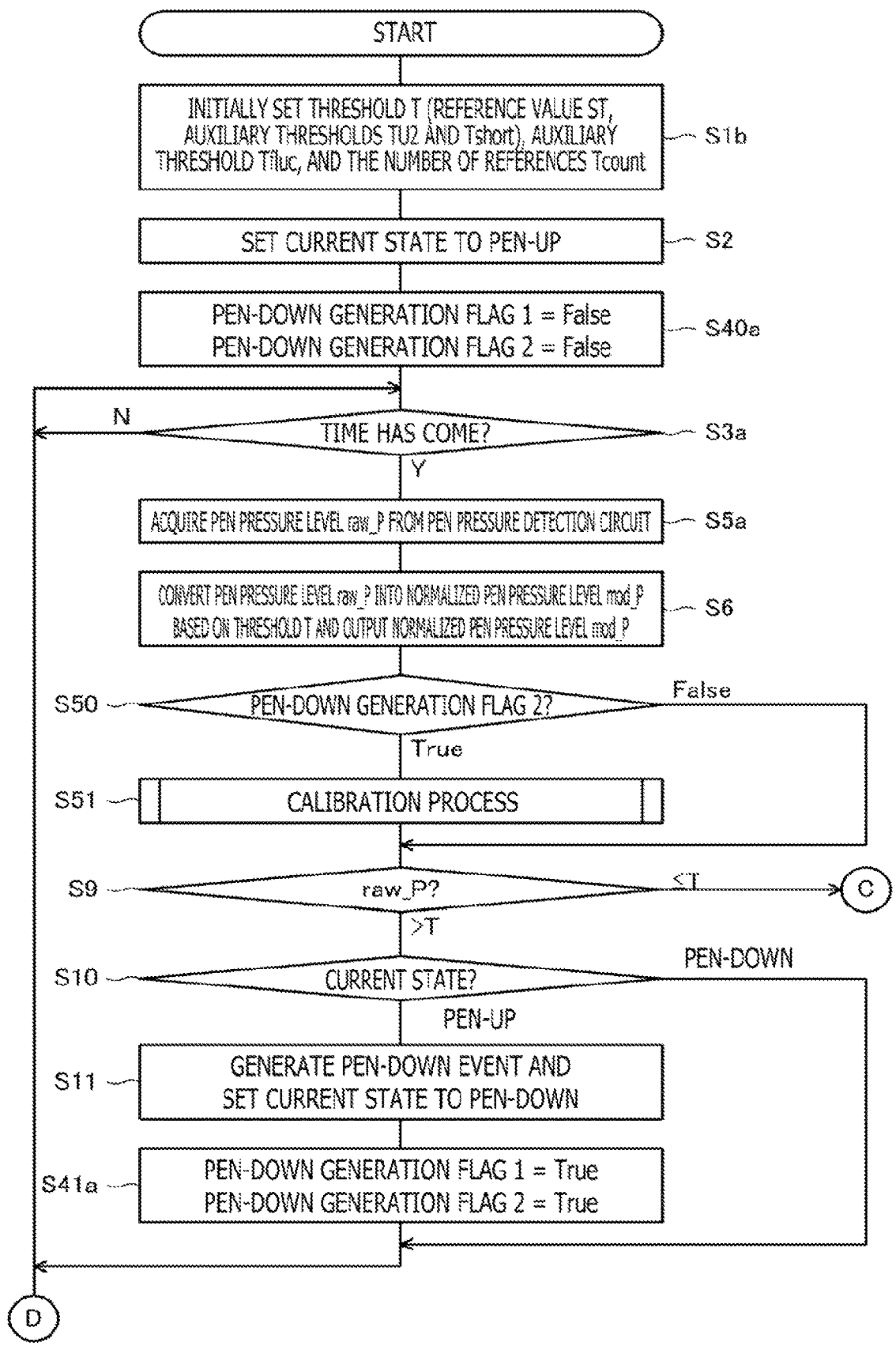
FIG. 18 is a flow diagram illustrating a processing flow of a process performed by the event determination and threshold update circuit according to a modification of the third embodiment of the present disclosure.

FIG. 18 is a flow diagram illustrating a processing flow of the process performed by the event determination and threshold update circuit 43 according to the present modification. As can be understood by comparing FIG. 18 and FIG. 16, the process performed by the event determination and threshold update circuit 43 according to the present modification is different from the process performed by the event determination and threshold update circuit 43 according to the present embodiment in that S11a, S40, and S41 are replaced by S11b, S40a, and S41a, respectively, and that S50 and S51 are added between S6 and S9. The differences will be mainly described.

The event determination and threshold update circuit 43 according to the present modification initially sets auxiliary thresholds Tshort and Tfluc (second and third auxiliary thresholds) and the number of references Tcount in addition to the pen pressure determination threshold T (system reference value ST and auxiliary threshold TU2) at S1b. As for the auxiliary threshold Tshort among these, the event determination and threshold update circuit 43 adds a predetermined margin to the system reference value ST to obtain a value greater than the auxiliary threshold TU2 and smaller than the pen pressure determination threshold T and uses the value as the auxiliary threshold Tshort. Therefore, as in the case of the pen pressure determination threshold T and the auxiliary threshold TU2, the derivation and the update of the auxiliary threshold Tshort are equivalent to the derivation and the update of the system reference value ST. Predetermined values are set for the auxiliary threshold Tfluc and the number of references Tcount.

The event determination and threshold update circuit 43 according to the present embodiment uses two flags for temporarily storing the fact that the pen-down is generated. Specifically, the event determination and threshold update circuit 43 sets pen-down generation flags 1 and 2 to False at S40a. The event determination and threshold update circuit 43 sets the pen-down generation flags 1 and 2 to True after generating the pen-down event at S11 (S41a). Note that the pen-down generation flag 1 is the same as the flag described in FIGS. 16 and 17.

The event determination and threshold update circuit 43 according to the present modification determines whether the pen-down generation flag 2 is True after executing S6 (S50). As a result, if the event determination and threshold update circuit 43 determines that the pen-down generation flag 2 is False, the event determination and threshold update circuit 43 moves the process to S9. On the other hand, if the event determination and threshold update circuit 43 determines that the pen-down generation flag 2 is True, the event determination and threshold update circuit 43 performs a calibration process of the pen pressure determination threshold T (S51).

Figure 19:
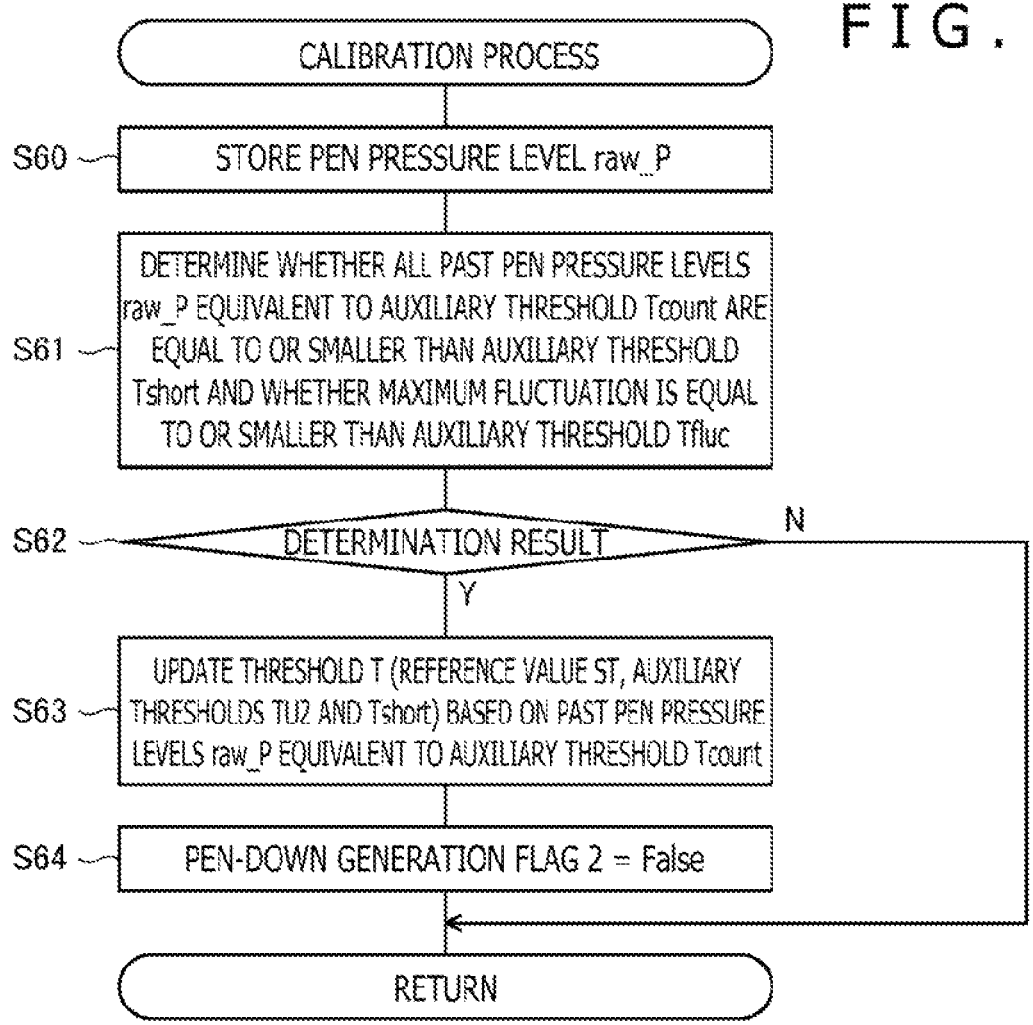
FIG. 19 is a flow diagram illustrating details of a calibration process performed at S51 of FIG. 18.

FIG. 19 is a flow diagram illustrating the details of the calibration process performed at S51. As illustrated in FIG. 19, the event determination and threshold update circuit 43 first stores the pen pressure level raw_P newly acquired at S5 in a memory not illustrated (S60). The process is performed to store, in the memory, the pen pressure levels raw_P at least equivalent to the number of references Tcount.

Next, the event determination and threshold update circuit 43 determines whether all of the past pen pressure levels raw_P equivalent to the number of references Tcount stored in the memory are equal to or smaller than the auxiliary threshold Tshort and the maximum fluctuation is equal to or smaller than the auxiliary threshold Tfluc (S61 and S62).

The event determination and threshold update circuit 43 that has obtained a negative result at S62 ends the calibration process and moves the process to S9 of FIG. 18. On the other hand, the event determination and threshold update circuit 43 that has obtained a positive result at S62 updates the pen pressure determination threshold T (system reference value ST, auxiliary thresholds TU2 and Tshort) based on the past pen pressure levels raw_P equivalent to the number of references Tcount stored in the memory (S63, second update state). Specifically, the event determination and threshold update circuit 43 uses an average value of the past pen pressure levels raw_P equivalent to the number of references Tcount stored in the memory to update the system reference value ST. The event determination and threshold update circuit 43 also adds a predetermined margin to the updated system reference value ST to calculate the pen pressure determination threshold T, the auxiliary thresholds TU2 and Tshort. Subsequently, the event determination and threshold update circuit 43 sets the pen-down generation flag 2 to False (S64), ends the calibration process, and moves the process to S9 of FIG. 18.

Figure 20:
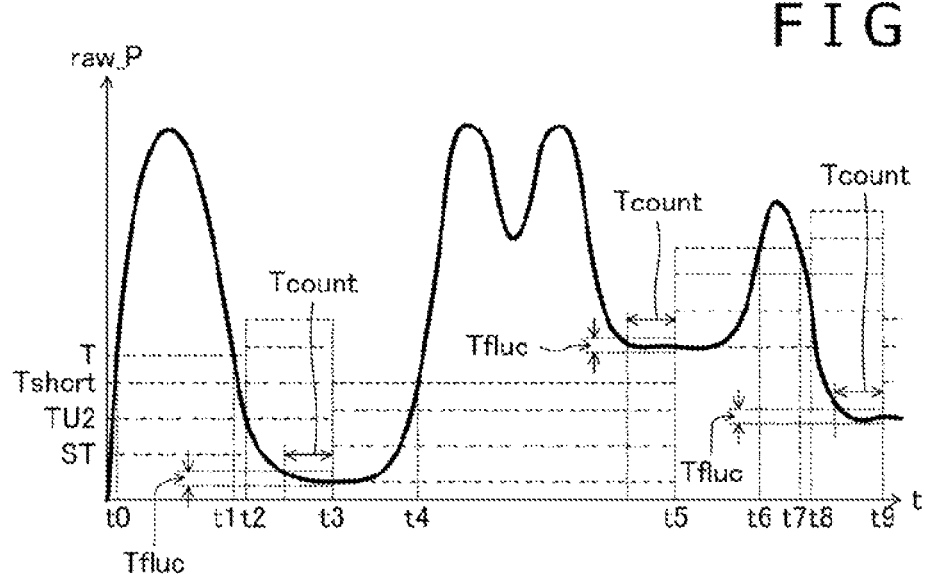
FIG. 20 depicts an action of the event determination and threshold update circuit according to a modification of the third embodiment of the present disclosure.

FIG. 20 depicts an action of the event determination and threshold update circuit 43 according to the present modification. In the example, after a kth pen-down event is generated at time t0, the pen pressure determination threshold T (system reference value ST, auxiliary thresholds TU2 and Tshort) is updated based on the latest pen pressure level raw_P at time t2 at which the pen pressure level raw_P falls below the auxiliary threshold TU2. At time t3 at which all of the past pen pressure levels raw_P equivalent to the number of references Tcount become equal to or smaller than the auxiliary threshold Tshort and the maximum fluctuation becomes equal to or smaller than the auxiliary threshold Tfluc, the pen pressure determination threshold T (system reference value ST, auxiliary thresholds TU2 and Tshort) is updated in the calibration process illustrated in FIG. 19.

After the generation of a (k+1)th pen-down event at time t2, the pen pressure determination threshold T (system reference value ST, auxiliary thresholds TU2 and Tshort) is updated in the calibration process illustrated in FIG. 19 at time t5 at which all of the past pen pressure levels raw_P equivalent to the number of references Tcount become equal to or smaller than the auxiliary threshold Tshort and the maximum fluctuation becomes equal to or smaller than the auxiliary threshold Tfluc. In this case, the pen pressure level raw_P is not below the auxiliary threshold TU2, and the update of the pen pressure determination threshold T (system reference value ST, auxiliary thresholds TU2 and Tshort) based on the latest pen pressure level raw_P is not performed.

After the generation of a (k+2)th pen-down event at time t6, the pen pressure determination threshold T (system reference value ST, auxiliary thresholds TU2 and Tshort) is updated based on the latest pen pressure level raw_P at time t8 at which the pen pressure level raw_P falls below the auxiliary threshold TU2. At time t9 at which all of the past pressure levels raw_P equivalent to the number of references Tcount become equal to or smaller than the auxiliary threshold Tshort and the maximum fluctuation becomes equal to or smaller than the auxiliary threshold Tfluc, the pen pressure determination threshold T (system reference value ST, auxiliary thresholds TU2 and Tshort) is updated in the calibration process illustrated in FIG. 19.

In this way, according to the present modification, the pen pressure determination threshold T (system reference value ST, auxiliary thresholds TU2 and Tshort) can be updated in the calibration process illustrated in FIG. 19 even when the pen pressure level raw_P does not fall below the auxiliary threshold TU2 so that the pen pressure determination threshold T (system reference value ST, auxiliary thresholds TU2 and Tshort) is not updated based on the latest pen pressure level raw_P. Therefore, the pen pressure determination threshold T can be more suitably calibrated.

Although the preferred embodiments of the present disclosure have been described, the present disclosure is not limited to the embodiments in any sense, and the present disclosure can be obviously carried out in various modes without departing from the scope of the present disclosure.

It is to be noted that the embodiments of the present disclosure are not limited to the foregoing embodiments, and that various changes can be made without departing from the spirit of the present disclosure.

What is claimed is:

1. A method performed by a pen or a pen detection apparatus that detects the pen, the method comprising:
   acquiring a pen pressure level according to a force applied to a pen nib of the pen;
   acquiring a proximity value indicating a positional relationship between the pen and the pen detection apparatus; and
   determining, based on the proximity value, whether the positional relationship satisfies a predetermined relationship;
   in response to determining that the positional relationship satisfies the predetermined relationship, updating a pen pressure determination threshold based on the pen pressure level
   comparing the pen pressure determination threshold updated by the updating with the pen pressure level acquired by the acquiring the pen pressure level in order to generate a pen-down event or a pen-up event;
   determining whether a current state of the pen is a pen-down state or a pen-up state based on a result of the comparing; and
   changing the current state of the pen from the pen-down state to the pen-up state in response to determining that the current state of the pen is the pen-down state, or changing the current state of the pen from the pen-up state to the pen-down state in response to determining that the current state of the pen is the pen-up state.

2. The method according to claim 1, wherein
   the updating of the pen pressure determination threshold includes updating the pen pressure determination threshold based on the pen pressure level when the proximity value indicates that the pen is separated from a panel surface of the pen detection apparatus.

3. The method according to claim 1, wherein
   the updating of the pen pressure determination threshold is not performed when the proximity value indicates that the pen is in contact with a panel surface of the pen detection apparatus.

4. The method according to claim 1, wherein
   the proximity value is generated based on a reception strength of a signal transmitted and received between the pen and the pen detection apparatus.

5. The method according to claim 1, wherein
   the proximity value is generated based on one or more of a detection result of detection of a capacitance generated between an electrode provided on the pen nib of the pen and an electrode arranged in a panel surface of the pen detection apparatus, a pressed state of a contact switch provided on the pen, an image of the panel surface of the pen detection apparatus imaged by an image sensor provided on the pen, and a result of echolocation performed by a sonar device provided on the pen.

6. The method according to claim 1, further comprising converting the pen pressure level into a normalized pen pressure level based on the pen pressure determination threshold.

7. The method according to claim 1, further comprising:
   detecting a plurality of the pens provided with different pen identifications;
   receiving the pen identifications from the plurality of the pens; and
   updating the pen pressure determination threshold for each of the received pen identifications.

8. A method performed by a pen or a pen detection apparatus that detects the pen, the method comprising:
   acquiring a pen pressure level according to a force applied to a pen nib of the pen;
   generating a pen-down event based on a result of comparing the pen pressure level and a first threshold, wherein the pen-down event indicates that the pen is moved from outside of a sensing range to inside of the sensing range, and the sensing range indicates a range in which the pen is detectable by the pen detection apparatus or the pen detection apparatus is detectable by the pen; and
   generating a pen-up event based on a result of comparing the pen pressure level and a second threshold different from the first threshold, wherein the pen-up event indicates that the pen is moved from inside of the sensing range to outside of the sensing range.

9. The method according to claim 8, further comprising calculating the second threshold as a value greater than the first threshold.

10. The method according to claim 8, wherein
    the calculating of the second threshold includes calculating the second threshold based on the first threshold and based on a peak value of the pen pressure level during a time that the pen is in a pen-down state.

11. The method according to claim 8, wherein
    the calculating of the second threshold includes calculating the second threshold based on the first threshold and based on a length of a time period in which the pen is in a pen-down state.

12. The method according to claim 8, further comprising updating the first threshold based on the pen pressure level when the pen is in a pen-up state.

13. The method according to claim 8, further comprising setting the first threshold to a value greater than the second threshold according to the generating of the pen-up event.

14. A method performed by a pen or a pen detection apparatus that detects the pen, the method comprising:
- acquiring a pen pressure level according to a force applied to a pen nib of the pen;
- generating a pen-down event based on a result of comparing the pen pressure level and a pen pressure determination threshold; and
- updating the pen pressure determination threshold to an updated pen pressure determination threshold, triggered by the generating of the pen-down event,
- wherein the generating of the pen-down event includes generating a (k+1)th pen-down event based on a result of comparing the pen pressure level and the updated pen pressure determination threshold after the updating the pen pressure determination threshold triggered by generating a kth pen-down event.

15. The method according to claim 14, wherein
the generating of the pen-down event includes generating the pen-down event when the pen pressure level exceeds the pen pressure determination threshold.

16. The method according to claim 14, wherein
in a first update, the updating of the pen pressure determination threshold includes updating the pen pressure determination threshold when the pen pressure level falls below a first auxiliary threshold smaller than the pen pressure determination threshold after the generating of the pen-down event.

17. The method according to claim 14, further comprising
a second updating of the pen pressure determination threshold when all of a predetermined number of past pen pressure levels become equal to or smaller than a second auxiliary threshold and a maximum fluctuation becomes equal to or smaller than a third auxiliary threshold.

18. The method according to claim 14, wherein
the second auxiliary threshold is greater than the first auxiliary threshold.

\* \* \* \* \*